US012006423B2

(12) United States Patent
Rix et al.

(10) Patent No.: US 12,006,423 B2
(45) Date of Patent: Jun. 11, 2024

(54) METHODS OF MAKING POLYMER COMPOSITIONS WITH ENHANCED ELASTICITY BY EMPLOYING VTP AND HMP CATALYST SYSTEMS IN PARALLEL PROCESSES

(71) Applicant: ExxonMobil Chemical Patents Inc., Baytown, TX (US)

(72) Inventors: Francis C. Rix, Houston, TX (US); Jo Ann M. Canich, Houston, TX (US); Rainer Kolb, Kingwood, TX (US)

(73) Assignee: ExxonMobil Engineering & Technology Company, Baytown, TX (US)

( * ) Notice: Subject to any disclaimer, the term of this patent is extended or adjusted under 35 U.S.C. 154(b) by 687 days.

(21) Appl. No.: 17/269,433

(22) PCT Filed: Aug. 15, 2019

(86) PCT No.: PCT/US2019/046679
§ 371 (c)(1),
(2) Date: Feb. 18, 2021

(87) PCT Pub. No.: WO2020/046597
PCT Pub. Date: Mar. 5, 2020

(65) Prior Publication Data
US 2021/0179827 A1 Jun. 17, 2021

Related U.S. Application Data

(60) Provisional application No. 62/724,284, filed on Aug. 29, 2018.

(51) Int. Cl.
*C08L 23/08* (2006.01)
*C08L 23/16* (2006.01)

(52) U.S. Cl.
CPC ............ *C08L 23/0815* (2013.01); *C08L 23/16* (2013.01); *C08L 2203/10* (2013.01); *C08L 2205/025* (2013.01); *C08L 2207/07* (2013.01); *C08L 2314/06* (2013.01)

(58) Field of Classification Search
CPC .. C08L 23/0815; C08L 23/16; C08L 2203/10; C08L 2205/025; C08L 2207/07; C08L 2314/06
See application file for complete search history.

(56) References Cited

U.S. PATENT DOCUMENTS

| 6,875,816 B2 | 4/2005 | DeGroot et al. |
| 6,924,342 B2 | 8/2005 | Stevens et al. |
| 7,999,039 B2 | 8/2011 | DeGroot et al. |
| 2019/0169322 A1 | 6/2019 | Rix et al. |
| 2019/0169413 A1 | 6/2019 | Canich et al. |

FOREIGN PATENT DOCUMENTS

| WO | WO-2016114914 A1 * | 7/2016 | ............. C08F 2/001 |
| WO | WO-2018013283 A2 * | 1/2018 | .......... B01J 31/2295 |

OTHER PUBLICATIONS

Dekmezian et al., "Characterization and Modeling of Metallocene-Based Branch-Block Copollymers", Macromolecules 2002, vol. 35, pp. 9586-9594.
Guzman et al., "Simple Model to Predict Gel Formation in Olefin-Diene Copolymerizations Catalyzed by Constrained-Geometry Complexes", AIChE Journal, May 2010, vol. 56, No. 5, pp. 1325-1333.
Nele et al., "Evolution of Molecular Weight and Long Chain Branch Distributions in Olefin-Diene Copolymerization", Macromol Theory Simul., 2003, vol. 12, pp. 582-592.
Ohtaki et al., "Allyl-Terminated Polypropylene Macromonomers: A Route to Polyolefin Elastomers with Excellent Elastic Behavior", Macromolecules 2015, vol. 48, pp. 7489-7494.
Ravishankar, "Treatise on EPDM", Rubber Chemistry and Technology, vol. 85, No. 3, pp. 327-349 (2012).
Rose et al., "Poly(ethylene-co-propylene macromonomer)s: Synthesis and Evidence for Starlike Conformations in Dilute Solution", Macromolecules 2008, vol. 41, pp. 559-567.
Shan et al., "Development of high Mooney viscosity, homogenous long-chain branched EPDM", Rubber World, May 2014, pp. 1-5.
Soares et al., "Polyolefin Microstructural Modeling", Polyolefin Reaction Engineering, First Edition, Wiley-VCH Verlag Gmbh & Co. KGaA, 2012, pp. 187-269.
VanRuymbeke et al., "Molecular rheology of branched polymers: decoding and exploring the role of architectural dispersity through a synergy of anionic synthesis, interaction chromatography, rheometry and modeling", Soft Matter, 2014, vol. 10, pp. 4762-4777.
Walter et al., "Influence of zirconocene structure and propene intent on melt rheology of polyethylene and ethane/propene copolymers", Polymer Bulletin, vol. 46, pp. 205-213, (2001).
Wang et al. "Dynamic mechanical and rheological properties of metallocene-catalyzed long-chain-branched ethylene/propylene copolymers", Polymer, vol. 45 (2004), pp. 5497-5505.

(Continued)

*Primary Examiner* — Michael M. Bernshteyn

(57) ABSTRACT

Provided herein are methods of making blended polymer compositions having enhanced elasticity. The present methods comprise the steps of producing a first polymer composition using a VTP catalyst system, producing a second polymer composition using a HMP catalyst system and combining the first polymer composition and the second polymer composition to make the blended polymer composition. The present methods include blending/combining the polymer compositions produced by different catalyst systems. One such catalyst system includes (i) a vinyl-terminated polymer (VTP) catalyst system comprising a VTP catalyst compound (referred to herein also as a "VTP catalyst") and one or more activators. Another catalyst system includes a high molecular-weight polymer (HMP) catalyst system comprising a HMP catalyst compound (referred to herein also as a "HMP catalyst") and one or more activators. The activators of these different catalyst systems can be the same or different in whole or in part.

19 Claims, 6 Drawing Sheets

(56) References Cited

OTHER PUBLICATIONS

Weng et al., "Long Chain Branched Isotactic Polypropylene" Macromolecules 2002, vol. 35, pp. 3838-3843.
Yang et al., "Alternative View of Long Chain Branch Formation by Metallocene Catalysts", Macromolecules 2010, vol. 43, pp. 8836-8852.

* cited by examiner

METHODS OF MAKING POLYMER COMPOSITIONS WITH ENHANCED ELASTICITY BY EMPLOYING VTP AND HMP CATALYST SYSTEMS IN PARALLEL PROCESSES

PRIORITY CLAIM

This application is a U.S. national phase application of PCT Application No. PCT/US2019/046679 having a filing date of Aug. 15, 2019, which claims priority to and the benefit of U.S. Provisional Application Ser. No. 62/724,284 having a filing date of Aug. 29, 2018, the contents of both of which are incorporated by reference in their entirety.

FIELD OF THE INVENTION

The present disclosure relates to polymer compositions having enhanced elasticity, and more particularly relates to methods of making such compositions by employing vinyl-terminated polymers (VTP) and high molecular weight polymers (HMP) catalyst systems in parallel processes and blending these polymer compositions.

BACKGROUND OF THE INVENTION

Polymer compositions having high molecular weight distribution and high Mooney viscosity are useful in dense weather seal and sponge applications. It is generally known that long chain branching of the polymers affects the viscosity of the polymer melts. For example, an increased number of long chain branches in the polymer increases the elasticity of a polymer composition due to the increase in time necessary for the polymer branches to relax during flow (van Ruyyembeke, et. al. Soft Matter 2014, 10, 4762 and ref. therein). Long chain branching further impacts polymer processing such as compounding and extrudability. At low shear rates, there is a high melt viscosity useful for compounding of the polymer with various agents. Also, at low shear rates, a high viscosity is useful for product stability during extrusion such as in blowing a bubble of polyethylene film or extruding a hose or stabilizing foam cells. On the other hand, an advantage of low viscosity at higher shear rates is associated with extrusion (shear thinning) which increases polymer throughput.

To produce polyolefins with long-chain branches ("LCB polyolefins") and polymer compositions containing such polyolefins, dienes can be added to the polymerization process (Nele, M. et. al. Macromol. Theory, Simul. 2003, 12, 582 and ref. therein). When each olefin of the diene is incorporated into a separate chain, a long chain branch is formed. This process can lead to higher order branch on branches but has the disadvantage of asymptotically approaching a point where insoluble gels are formed when the level of branches becomes too high (Guzman, J. D. et. al. AiChE 2010, 56, 1325). This approach can harm reactor operability, particularly in a solution polymerization process and can also negatively impact product appearance and provide points of failure for product testing.

Alternatively, polymer chains can be coupled so that the olefins have a reactive group along their backbone. For example, Vanadium based methods of preparing ethylene propylene diene monomer ("EPDM") polymer compositions contain high levels of branching, the origin of which has been proposed to be due to Lewis acids in the system coupling ENB (5-ethylidene-2-norbornene) from separate polymer chains (Ravishankar, P. S., Rubber Chemistry and Technology 2012, 85 (3) 327 and ref. therein). Lewis bases, such as ammonia, have been reportedly used to lower the concentration of the Lewis acids, by formation of acid-base pairs, and thus reduce the level of branching. The disadvantage of this system is that insoluble high molecular weight gels form as the crosslinks form a very large network, similarly to the diene systems.

A strategy for creating LCB polyolefins and avoiding in-reactor gels is to employ macromonomers. Useful macromonomers are polymer chains containing one polymerizable group such as a vinyl end group. During a polymerization, these are copolymerized with other monomers to create a LCB-structure (Soares, J. B. P; McKenna, T. F. L. Polyolefin Reaction Engineering, Wiley VCH 2012). It is necessary for the molecular weight of macromonomers to be greater than the entanglement molecular weight (MW) to see a pronounced rheological effect. This can vary from 2000 g/mol for polyethylene or syndiotactic polypropylene to 7000 g/mol for atactic or isotactic PP. These are much higher than the MW of the monomers in the system (e.g, Ethylene, propylene). As such, the molar concentration of the macromonomer is much lower than the other monomers in the system and the level of incorporation is low. The result is that LCB due to macromonomer incorporation can be difficult to detect spectroscopically while the rheological signature of LCB is present.

Also, there have been reports of two catalysts working together to make long chain branched polyolefins. For example, Dekmezian reported using $Cp_2ZrCl_2$/MAO to prepare a macromonomer from ethylene and butene and $Me_2Si$ $(tBuN)((Me_4Cp)TiCl_2$ to partially incorporate it into an ethylene/butene copolymer (Dekmezian, et. al. Macromolecules 2002, 33, 9586). Walter reported that homo and copolymerization of ethene using $(Me_5Cp)_2ZrCl_2$ and rac-$Me_2Si(2-Me, 4-PhInd)_2ZrCl_2$ produced long chain branched polymers as determined by rheology (Walter, et. al. Polymer Bulletin 2001, 46, 205). More recently, Coates and coworkers prepared poly(ethylene-co-propylene) macromonomers with a fluorinated phenoxy imine titanium catalyst (Coates Macromolecules 2008, 41, 559). Coates subsequently homopolymerized these macromonomers with a nickel catalyst and copolymerized them with propylene using a pyridyl-amido hafnium catalyst (Coates Macromolecules 2015, 48, 7489).

Further, single catalysts systems for making long-chain branched polyolefins have been reported for solution and supported catalysts. For instance, supported metallocene-polyethylene catalysts have been reported to give long chain branched polyethylene in slurry or gas-phase processes (Yang, et al. Macromolecules 2010, 43, 8836). The phenomenon has also been observed in solution for ethylene-propylene copolymers prepared from $Me_2Si(Me_4Cp)(tBuN)$ $TiMe_2$ activated with $(C_6F_5)_3B$ modified MAO (Wang, et. al. Polymer 2004, 45, 5497). Similarly, LCB formation has been observed for polypropylene when rac-$Me_2Si(2-Me, 4-PhInd)_2ZrCl_2$ activated with MAO was employed as the catalyst under conditions of low propylene concentration (Weng, et. al. Macromolecules 2002, 35, 3838)

For EPDM applications, high molecular weight EPDM have been produced with long chain branching using constrained geometry catalysts (Li Pi Shan, et. al. Development of High Moone Viscosity, Homogeneous Long-chain Branched EPDM, Fall 2013 ACS Rubber Division Meeting). However, the high molecular w eight polymer compositions (including high molecular weight EPDM) cannot be produced with metallocene catalysts. While it may be possible to make the high molecular weight EPDM in one reactor using a mixed catalyst/bimodal approach, issues exist with poisons selectively affecting one catalyst over another complicate process control. Therefore, a need exists for methodologies to produce polymer compositions having high molecular weight distribution and enhanced elasticity with metallocene catalysts while providing good reactor performance.

SUMMARY OF THE INVENTION

Disclosed herein is a method of making a blended polymer composition having enhanced elasticity including the steps of providing a first polymer composition, wherein the first polymer composition is a VTP composition produced with a VTP catalyst compound; providing a second polymer composition, wherein the second polymer composition is a HMP composition produced with a HMP catalyst compound; combining the first polymer composition and the second polymer composition, and recovering a blended polymer composition; wherein weight average molecular weight of the HMP composition is greater than that of the VTP composition and wherein the VTP catalyst compound is represented by the formula:

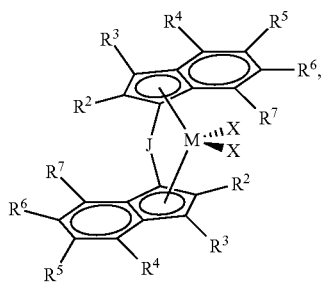

wherein
(1) J is a divalent bridging group comprising C, Si or both;
(2) M is a group 4 transition metal;
(3) each X is independently a univalent anionic ligand, or two Xs joined to form a chelating ligand, a diene ligand, or an alkylidene ligand; and
(4) each of $R^2$-$R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ can optionally be bonded together to form a saturated or partially saturated cyclic or fused ring structure.

DESCRIPTION OF THE PREFERRED EMBODIMENTS

Figure 1:
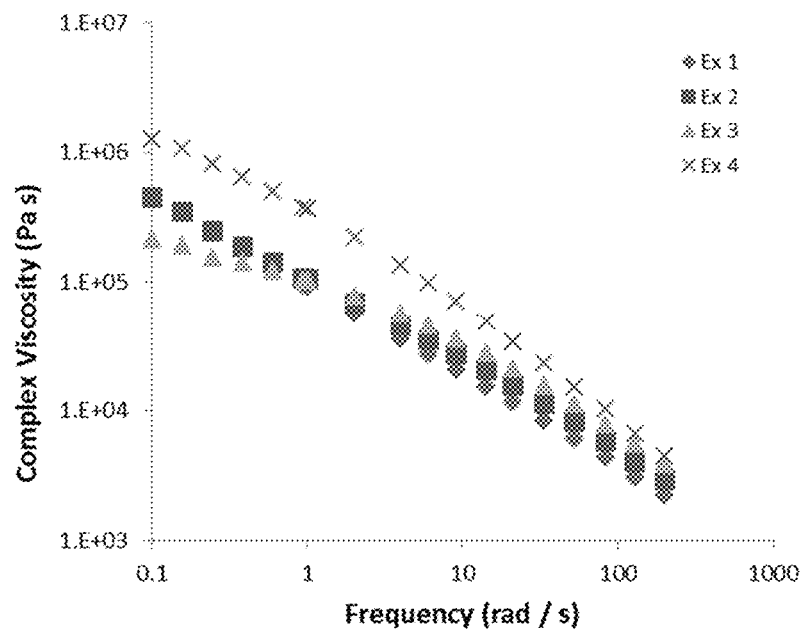
FIG. 1 shows Complex viscosity vs Frequency for Examples 1-4.

Various specific embodiments, versions and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

As used herein, the terms "activator" and "cocatalyst" refer to one or more compounds which can activate a catalyst compound by converting the neutral catalyst compound to a catalytically active catalyst compound cation.

The term "alkyl" group refers to a linear, branched, or cyclic radical of carbon and hydrogen.

The term "allyl chain end" is represented by $CH_2CH$—$CH_2$ as shown in the formula:

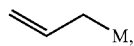

where M represents the polymer chain. A 3-alkyl chain end, also referred to as a "3-alkyl vinyl end group" or a "3-alkyl vinyl termination", is represented by the formula.

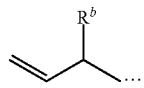

3-alkyl vinyl end group,
where "••••" represents the polyolefin chain and $R^b$ is an alkyl group, such as methyl, ethyl, propyl, butyl, pentyl, hexyl, heptyl, octyl, nonyl, decyl, undecyl, dodecyl, and the like. $R^b$ may be substantially larger, e.g., $C_{1-50}$, $C_{1-100}$ or greater, provided that $R^b$ is a shorter alkyl chain than the polyolefin chain.

The term "anionic ligand" refers to a negatively charged ligand which donates one or more pairs of electrons to a metal ion.

The term "catalyst compound" may be used interchangeably with the terms "catalyst," "catalyst precursor," "transition metal compound," "transition metal complex," and "precatalyst."

The term "catalyst system" refers to a system incorporating a catalyst that can polymerize monomers to a polymer, or a catalyst precursor/activator pair, and optional co-activator, and an optional support material. When catalyst systems are described as comprising neutral stable forms of the components, the ionic form of the component is the form that reacts with the monomers to produce polymers. As used herein, when the term "catalyst system" is used to describe such a precursor/activator pair before activation, it means the unactivated catalyst ("precatalyst" or "catalyst precursor") together with an activator and, optionally, a co-activator. As used herein, when the term catalyst system is used to describe such a pair after activation, it means the activated catalyst and the activator or other charge-balancing moiety.

The term "continuous" refers to a system that operates for at least a period of time without interruption or cessation. For example, the term "continuous process" refers to a process to produce a polymer where the reactants are continually introduced into one or more reactors and polymer product is continually withdrawn.

The terms "elastomer" or "elastomeric composition" may be used interchangeably and refer to any polymer or composition of polymers (such as 5 blends of polymers) consistent with the ASTM D1566 definition. Elastomer includes mixed blends of polymers such as melt mixing and/or reactor blends of polymers. The term "elastomer" may be used interchangeably with the term "rubber" and refers to any composition comprising at least one elastomer.

The terms "ethylene polymer" or "ethylene copolymer" may be used interchangeably and refer to a polymer or copolymer comprising at least 50 mole % ethylene derived units. Ethylene refers to an α-olefin.

The term "high molecular weight polymer" or "HMP" refers to a polymer, typically a copolymer, having Mw of 50,000 g/mol or greater and produced by an HMP catalyst system as described herein. The term "HMP-VTP" may be used herein to denote a sub-set of HMPs which incorporate one or more units derived from a vinyl-terminated polymer (VTP) as defined below and described in greater detail herein.

The term "HMP catalyst" refers to a catalyst compound capable of producing high molecular weight (Mw greater than 50,000 g/mol) copolymers (HMPs) as described herein. The term "HMP catalyst" is not, alone, intended to limit such catalysts; rather, the label is provided as a convenient means to distinguish HMP catalysts and HMP catalyst systems described herein from other catalysts and catalyst systems, such as the VTP catalyst systems or catalyst systems.

The term "hydrocarbyl radical" refers to a radical, which contains hydrogen atoms and up to 50 carbon atoms and which may be linear, branched, or cyclic, and when cyclic, aromatic or non-aromatic. Also, as used herein, the terms "hydrocarbyl radical," "hydrocarbyl" and "hydrocarbyl group" may be used interchangeably throughout this description. Likewise, the terms "group," "radical," and "substituent" (when referring to subsets of chemical compounds) are also used interchangeably.

The term "metallocene catalyst" refers to as an organometallic compound with at least one π-bound cyclopentadienyl (Cp) moiety (or substituted cyclopentadienyl moiety such as indenyl or fluorenyl), and more frequently two π-bound cyclopentadienyl moieties or substituted cyclopentadienyl moieties. This includes other π-bound moieties such as indenyls or fluorenyls or derivatives thereof. When used in relation to metallocene catalysts, the term "substituted" means that a hydrogen group has been replaced with a hydrocarbyl group, a heteroatom, or a heteroatom containing group. For example, methylcyclopentadiene is a Cp group substituted with a methyl group.

The term "Mn" refers to number average molecular weight. The term "Mw" refers to weight average molecular weight. The term "Mz" refers to z average molecular weight. The term "wt %" refers to weight percent. The term "mol %" refers to mole percent. As used herein, the terms "molecular weight distribution," "MWD," "polydispersity," or "PDI" may be used interchangeably and refer to Mw divided by Mn, (Mw/Mn). Unless otherwise noted, all molecular weight units (e.g., Mw, Mn, Mz) are g/mol.

The distribution and the moments of molecular weight (Mw, Mn, Mw/Mn, etc.), the comonomer content (C2, C3, C6, etc.) and the long chain branching (g') are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is Altered through a 0.1 μm Teflon filter and degassed with an online degasser before entering the GPC instrument. The nominal flow rate is 1.0 mL/min and the nominal injection volume is 200 μL. The whole system including transfer lines, columns, detectors are contained in an oven maintained at 145° C. Given amount of polymer sample is weighed and sealed in a standard vial with 80 μL flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples.

The concentration (c), at each point in the chromatogram is calculated from the baseline-subtracted IR5 broadband signal intensity (I), using the following equation:

$$c=\beta I,$$

where β is the mass constant determined with PE or PP standards. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10M. The MW at each elution volume is calculated with following equation.

$$\log M = \frac{\log(K_{PS}/K)}{a+1} + \frac{a_{PS}+1}{a+1}\log M_{PS},$$

where the variables with subscript "PS" stands for polystyrene while those without a subscript are for the test samples. In this method, $a_{PS}=0.67$ and $K_{PS}=0.000175$ while a and K are calculated from a series of empirical formula established in ExxonMobil and published in literature (T. Sun, P. Brant, R. R Chance, and W. W Graessley, Macromolecules, Volume 34, Number 19, pp. 6812-6820, (2001)). Specifically, a/K=0.695/0.000579 for PE and 0.705/0.0002288 for PP.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR.

The LS detector is the 18-angle Wyatt Technology High Temperature DAWN HELEOSII. The LS molecular weight (M) at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c,$$

Here, $\Delta R(\theta)$ is the measured excess Rayleigh scattering intensity at scattering angle $\theta$, c is the polymer concentration determined from the IR5 analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, n=1.500 for TCB at 145° C. and $\lambda$=665 nm.

A high temperature Agilent (or Viscotek Corporation) viscometer, which has four capillaries arranged in a Wheatstone bridge configuration with two pressure transducers, is to used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$[\eta] = \eta_s / c,$$

where c is concentration and was determined from the IR5 broadband channel output. The viscosity MW at each point is calculated from the below equation:

$$M = K_{PS} M^{a_{PS}+1}/[\eta],$$

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i},$$

where the summations are over the chromatographic slices, i, between the integration limits. The branching index $g'_{vis}$ is defined as:

$$g'_{vis} = \frac{[\eta]_{avg}}{kM_v^a},$$

$M_V$ is the viscosity-average molecular weight based on molecular weights determined by LS analysis. The K/a are for the reference linear polymer which is usually PE with certain amount of short chain branching.

For GPC analyses, the concentration is expressed in g/cm³, molecular weight is expressed in g/mole, and intrinsic viscosity is expressed in dL/g unless otherwise noted.

As used herein, the terms "Mooney viscosity" or "ML" are used interchangeably and refer to the measured or reported Mooney viscosity of a polymer or polymer composition. As used herein Mooney viscosity is measured as ML (1+4) at 125° C. in Mooney units according to ASTM D-1646. A square sample is placed on either side of the rotor. The cavity is filled by pneumatically lowering the upper platen. The upper and lower platens are electrically heated and controlled at 125° C. The torque to turn the rotor at 2 rpm is measured by a transducer. The sample is pre-heated for 1 minute after the platens are closed. The motor is then started and the torque is recorded for a period of 4 minutes. The results are reported as ML (1+4) 125° C., where M is the Mooney viscosity number, L denotes large rotor, 1 is the pre-heat time in minutes, 4 is the sample run time in minutes after the motor starts, and 125° C. is the test temperature.

Mooney Relaxation Area is obtained from the Mooney viscosity measurements when the rubber has relaxed after the rotor has stopped. The MLRA is an integrated area under the Mooney curve from 1 to 100 seconds. Mooney Relaxation Area is dependent on the Mooney viscosity of the polymer, and increases with increasing Mooney viscosity. In order to remove the dependence on polymer Mooney Viscosity, a corrected MLRA (cMLRA) parameter is used, where the MLRA of the polymer is normalized to a reference of 80 Mooney Viscosity. The formula for cMLRA is provided below $$cMLRA = MLRA(80/ML)^{1.44},$$

where MLRA and ML are the Mooney Relaxation Area and Mooney Viscosity of the polymer sample measured at 125° C.

The parameter cMLRA can be regarded as a stored energy term, which suggests that after removal of the applied strain, the longer or branched polymer chains store more energy and would require a longer time to relax. The cMLRA values for a bi-modal or a branched polymer are typically higher than that of a linear polymer or mixtures thereof.

However, Mooney viscosity values greater than about 100 cannot generally be measured under these conditions. In this event, the Mooney measurement is carried out using a non-standard small rotor as described below.

The non-standard rotor design is employed with a change in Mooney scale that allows the same instrumentation on the Mooney machine to be used with higher Mooney polymers. This rotor is termed MST—Mooney Small Thin. One MST point is approximately 5 ML points when MST is measured at (5+4 @ 200° C.) and ML is measured at (1+4 @ 125° C.).

ASTM D1646-99 prescribes the dimensions of the rotor to be used within the cavity of the Mooney machine. This prescription allows a large and a small rotor differing only in diameter. These are referred to as ML (Mooney Large) and MS (Mooney Small). However, EPDM can be produced at such high MW that the torque limit of the Mooney machine can be exceeded using these standard prescribed rotors. In these instances, the test is run using the MST rotor that is both smaller in diameter and thinner Typically when the MST rotor is employed, the test is also run at different time and temperature. The pre-heat time is changed from the standard 1 minute to 5 minutes and the test is run at 200° C. instead of the standard 125° C. Thus, the value will be reported as MST (5+4), 200° C. Note that the run time of 4 minutes at the end of which the Mooney reading is taken remains the same as the standard conditions. Mooney Small Thin Relaxation Area (MSTRA) is obtained from the Mooney Small Thin viscosity measurements when the rubber has relaxed after the rotor has stopped. The MSTRA is an integrated area under the Mooney curve from 1 to 100 seconds.

The MST rotor should be prepared as follows: The rotor should have a diameter of 30.48±0.03 mm and a thickness of 2.8±0.03 mm (tops of serrations) and a shaft of 11 mm or less in diameter. The rotor should have a serrated face and edge, with square grooves of 0.8 mm width and depth of 0.25-0.38 mm cut on 1.6 mm centers. The serrations will consist of two sets of grooves at right angles to each other (form a square crosshatch) The rotor is positioned in the center of the die cavity such that the centerline of the rotor disk coincides with the centerline of the die cavity to within a tolerance of ±0.25 mm. A spacer or a shim may be used to raise the shaft to the midpoint.

The term "olefin" refers to a linear, branched, or cyclic compound of carbon and hydrogen having at least one double bond. For purposes of this disclosure, when a polymer or copolymer is referred to as comprising an olefin, the olefin present in such polymer or copolymer is the polymerized form of the olefin. For example, when a copolymer is said to have an "ethylene" content of 35 wt % to 55 wt %, the mer unit in the copolymer is derived from ethylene in the polymerization reaction and said derived units are present at 35 wt % to 55 wt %, based upon the weight of the copolymer. An α-olefin includes α-olefinic macromonomers of up to 2000 mer units.

Olefin content was measured by NMR Spectroscopy. Samples were propped at 130-140° C. using a ODCB/$C_6D_6$ solution prepared from approximately 20 mg of polymer and 1 mL of solvent mixture.

The $^1H$ solution NMR was performed on a 5 mm or 10 mm probe at a field of at least 500 MHz in an ODCB (ortho-dichlorobenzene) and benzene-$d_6$ ($C_6D_6$) mixture (9:1) at 120° C. with a flip angle of 30°, 15 s delay, and 512 transients. Signals were integrated and the ENB weight percent was reported.

Calculation of ENB and double bonds was performed as shown below:

$I_{major}$=Integral of major ENB species from 5.2-5.4 ppm $I_{minor}$=Integral of minor ENB species from 4.6-5.12 ppm $I_{eth}$=(Integral of —$CH_2$— from 0-3 ppm)

total=(ENB+EP)

total wt=(ENB*120+EP*14)

| Peak Assignments | Intensity of species | MOLE % | WEIGHT % |
|---|---|---|---|
| Olef: 5.3 and 5.1 ppm ENB | ENB = $I_{major}$ + $I_{minor}$ | ENB*100/total | ENB*120*100/total wt |
| EP: 3-0 ppm | EP = ($I_{eth}$-11*ENB)/2 | EP*100/total | EP*14*100/total wt |

| Peak Assignments | Intensity of species | Branches/1000 carbons |
|---|---|---|
| Vinylene (5.55-5.31 ppm) | $I_{vinylene}$ = Vinylene/2 | I vinylene*1000/total |
| Trisubstituted* (5.30-5.12 ppm) | $I_{Trisub}$ = Trisub/1 | I trisub*1000/total |
| Vinyl (5.09-4.95 ppm) | $I_{vinyl}$ = Vinyl/2 | I vinvl*1000/total |
| Vinylidene (4.84-4.69 ppm) | $I_{vinylidene}$ = Vinylidene/2 | I vinylidene*1000/total |

*Tri-substituted may have overlap with ENB major.

The term "polymer" refers to a compound that has two or more of the same or different mer units. The term "homopolymer" refers to a polymer having mer units that are the same. The term "copolymer" refers to a polymer having two or more mer units that are different from each other. The term "terpolymer" refers to a polymer having three mer units that are different from each other. Accordingly, the definition of copolymer, as used herein, includes terpolymers and the like.

The term "polymerization catalyst system" refers to a catalyst system that can polymerize monomers to polymer.

The terms "propylene polymer" or "propylene copolymer" may be used interchangeably and refer to a polymer or copolymer comprising at least 50 mole % propylene derived units. As described herein, additional polymers may be defined in a similar way.

The term "ring structure" refers to atoms bonded together in one or more cyclic arrangements.

The term "rubber" refers to any polymer or composition of polymers consistent with the ASTM D1566 definition: "a material that is capable of recovering from large deformations, and can be, or already is, modified to a state in which it is essentially insoluble (but can swell) in boiling solvent."

Small Angle Oscillatory Shear (SAOS) measurements were carried out using the ATD® 1000 Rubber Process Analyzer from Alpha Technologies. A sample of approximately 4.5 g weight is mounted between the parallel plates of the ATD® 1000 The test temperature is either 100° C. or 125° C., the applied strain is 14% and the frequency was varied from 0.1 rad/s to 200 rad/s. The complex modulus (G*), complex viscosity) ($\eta$*) and the phase angle ($\delta$) are measured at each frequency. The phase angle at G*=100,000 Pa was calculated from a cubic fit of the data. The crossover point (at which the storage and loss moduli are equal, and $\delta$=45°) was calculated from linear interpolation of the $\delta$ vs frequency data.

The term "scavenger" refers to a compound that is typically added to facilitate oligomerization or polymerization by scavenging impurities. Some scavengers may also act as activators and may be referred to as co-activators. A co-activator, that is not a scavenger, may also be used in conjunction with an activator in order to form an active catalyst. In some embodiments a co-activator can be pre-mixed with the transition metal compound to form an alkylated transition metal compound.

The term "transition metal compound" refers to a catalyst compound that is neutral such as a precatalyst, or that is a charged species with a counter ion such as in an activated catalyst system.

The terms "vinyl chain end" or "vinyl termination" refers to a vinyl group located at a terminus of a polymer, and can be located on any one or more termini of the polymer. A vinyl chain end may be either an "allyl chain end" or a "3-alkyl chain end." Reference to a vinyl-terminated "macromonomer" is not intended, alone, to limit the size (e.g., Mw or Mn) of the VTP, nor the necessary use of the VTP, but merely is a reference of convenience, given the potential treatment of the VTP as a "monomer" to be incorporated into another polymer, such as a HMP.

The terms "vinyl-terminated polymer," "vinyl-terminated macromonomer," or "VTP" (VTPs in the plural) may be used interchangeably and refer to a polymer, which may be suitable for use as macromonomer, having a specified percentage (e.g., greater than 40%) of vinyl chain ends, relative to total polymer chain-end unsaturations.

The term "VTP catalyst" refers to a catalyst compound that is capable of producing VTPs and VTP compositions described herein. A VTP catalyst is capable of producing polymer having greater than 60% of vinyl chain ends, relative to total polymer chain-end unsaturations (preferably greater than 70%, preferably greater than 80%, preferably greater than 85%, preferably greater than 90%, preferably greater than 95%, preferably greater than 98%). As with the HMP catalyst, the term "VTP catalyst" is not, alone, intended to limit the types of catalyst. Rather, the label is provided as a convenient means to distinguish VTP catalysts and catalyst systems described herein from other catalysts and catalyst systems, such as the HMP catalysts or catalyst systems.

The weight % of ethylene (C2) and 5-ethylidene-2-norbornene (ENB) content was determined by infrared spectroscopy of polymer films per ASTM methods D3900 and D6047 respectively.

As used herein, the numbering scheme for the Periodic Table Groups is the notation as set out in CHEMICAL AND ENGINEERING NEWS, 63(5), 27 (1985). Therefore, a "group 4 metal" is an element from group 4 of the Periodic Table, e.g. Zr, Ti, and Hf.

Methods of Making Blended Polymer Compositions

The present methods include blending/combining the polymer compositions produced by different catalyst systems. One such catalyst system includes (i) a vinyl-terminated polymer (VTP) catalyst system comprising a VTP catalyst compound (referred to herein also as a "VTP catalyst") and one or more activators. Another catalyst system includes a high molecular-weight polymer (HMP) catalyst system comprising a HMP catalyst compound (referred to herein also as a "HMP catalyst") and one or more activators. The activators of these different catalyst systems can be the same or different in whole or in part.

The first polymer composition and/or the second polymer composition are made from at least a portion of a plurality of monomers. The plurality of monomers comprises at least: (1) a first $C_2$-$C_{20}$ $\alpha$-olefin; (2) a second $C_2$-$C_{20}$ $\alpha$-olefin different from the first; and, optionally, (3) one or more dienes. In an aspect, the plurality of monomers comprises. (1) ethylene; (2) a second $C_3$-$C_{20}$ $\alpha$-olefin such as propylene and/or butene; and (3) one or more dienes.

The blend components may be physically mixed as solids and melt blended in an extruder. More preferably, the blend components are blended in solution Even more preferably, the blend components are made in two reactors in a parallel solution process and blended in-line after exiting from the reactors. The solvent in this process is preferably an alkane or mixture of alkanes that may be linear, branched, or cyclic. More preferably the solvent is predominantly iso-hexane.

VTP Catalyst Systems

As described herein, the VTP catalyst system includes a catalyst compound and an activator, as well as an optional support and/or optional co-activators, in particular aspects. The VTP catalyst system produces vinyl-terminated polymer compositions (VTP compositions) with rheology and molecular weight characteristics consistent with long-chain branched polymer.

As described herein, VTP catalyst systems are capable of forming VTPs, that is, polymers and copolymers having more than 40% vinyl chain ends relative to total polymer chain-end unsaturation. The VTP polymers are made up of one or more ethylene, alpha-olefins, cyclic olefins, and dienes. Preferably the monomers are ethylene and an alpha olefin such as 1-hexene, 1-butene, or propene. In another preferred embodiment, the monomers are ethylene, propylene and 5-ethylidene-2-norbornene. The polymers preferably have Mw between 5,000 and 500,000 g/mol. More preferably the Mw is between 20,000 and 400,000 and even more preferably Mw is between 100,000 and 300,000 g/mol. The VTP polymers preferably have g'(vis avg)<0.95 and more preferably <0.9 and even more preferably <0.85. The molecular weight distributions of the polymers are preferably >2.5 and more preferably >3 and even more preferably >3.5. The small angle oscillatory sheer rheology of the polymers preferably has Tan(δ), the ratio of the loss and storage moduli (G"/G') at 0.245 $s^{-1}$≤1 and more preferably Tan(δ)≤0.9 and even more preferably Tan(δ)≤0.8 at either 100 or 125° C. Another characteristic of VTP polymers is a Sheer Thinning Ratio (complex viscosity at 0.1 Rad/s)/(complex viscosity at 128 Rad/s) preferably >50 and more preferably >100 at either 100 or 125° C. Thinning Ratio (complex viscosity at 0.1 Rad/s)/(complex viscosity at 128 Rad/s) preferably >50 and more preferably >100 at either 100 or 125° C. A further characteristic of VTP polymers is a low frequency at which the storage and loss moduli are equivalent. In preferred embodiments G"/G'=1 at <4 Rad/s and in more preferred embodiments G"/G'=1 at <0.1 Rad/s at either 100 or 125° C. In this latter case, plots of G' and G" versus frequency for VTP do not cross between 0.1 and 128 Rad/s. An additional characteristic of VTP polymers is a phase angle below 50° and preferably below 45° and even more preferably below 40° when G*=100,000 Pa at 100 or 125° C. An additional characteristic of VTP polymers is high cMLRA. When ML(1+4, 125° C.) is >10, cMLRA is preferably >300 and more preferably >400 and even more preferably >500.

Activators useful with the VTP Catalyst compound . . . .

VTP Catalyst Compounds

VTP catalyst compounds useful in the VTP catalyst systems described herein include a metallocene represented by the formula:

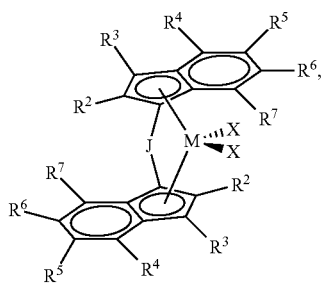

where: (1) J is a divalent bridging group comprising C, Si or both; (2) M is a group 4 transition metal (preferably Hf); (3) each X is independently a univalent anionic ligand, or two Xs are joined and bound to the metal atom to form a metallocycle ring, or two Xs are joined to form a chelating ligand, a diene ligand, or an alkylidene ligand; and (4) each of $R^2$, $R^3$, $R^4$, $R^5$, $R^6$, and $R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ can optionally be bonded together to form a saturated or partially saturated cyclic or fused ring structure Such VTP catalyst compounds are also referred to as bis-indenyl metallocene compounds.

In certain aspects, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof. Two Xs can form a part of a fused ring or a ring system. In particular embodiments, each X is independently selected from halides and $C_1$ to $C_5$ alkyl groups. For instance, each X can be a chloro, bromo, methyl, ethyl, propyl, butyl or pentyl group. In specific embodiments, each X is a methyl group.

In an aspect, each $R^2$, $R^3$, $R^4$, $R^5$, $R^6$, and $R^7$ are independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2C(CH_3)_3$ $CH_2Si(CH_3)_3$; $CH_2Ph$; $C_3H_5$; $C_4H_7$; $C_5H_9$; $C_6H_{11}$; $C_7H_{13}$; $C_8H_{15}$; $C_9H_{17}$; $CH_2Si(CH_3)_3$; $CH_2CH=CH_2$, $CH_2CH_2CH=CH_2$; $CH_2CH_2(CF_2)_7CF_3$; $CF_3$; $N(CH_3)_2$; $N(C_2H_5)_2$; and $OC(CH_3)_3$.

In an aspect, each $R^2$, $R^3$, $R^4$, $R^5$, $R^6$, and $R^7$ can be independently selected from hydrogen, or $C_1$-$C_{10}$ alkyl (preferably hydrogen, methyl, ethyl, propyl, butyl, pentyl, heptyl, hexyl, octyl, nonyl, decyl or an isomer thereof).

In yet other aspects, each $R^3$ is hydrogen; each $R^4$ is independently a $C_1$-$C_{10}$ alkyl (preferably methyl, ethyl, propyl, butyl, pentyl, heptyl, hexyl, octyl, nonyl, decyl or an isomer thereof); each $R^2$, and $R^7$ are independently hydrogen, or $C_1$-$C_{10}$ alkyl (preferably hydrogen, methyl, ethyl, propyl, butyl, pentyl, heptyl, hexyl, octyl, nonyl, decyl or an isomer thereof); each $R^5$ and $R^6$ are independently hydrogen, or $C_1$-$C_{50}$ substituted or unsubstituted hydrocarbyl (preferably hydrogen, methyl, ethyl, propyl, butyl, pentyl, heptyl, hexyl, octyl, nonyl, decyl or an isomer thereof); and $R^4$ and $R^5$, $R^5$ and $R^6$ and/or $R^6$ and $R^7$ can optionally be bonded together to form a ring structure.

In an aspect, each $R^2$ is independently a $C_1$ to $C_3$ alkyl group such as methyl, ethyl, n-propyl, isopropyl or cyclopropyl. $R^3$, $R^5$, $R^6$, and $R^7$ can be hydrogen, and $R^4$ and $R^7$ can be independently a $C_1$ to $C_4$ alkyl group, preferably methyl, ethyl, propyl, butyl or an isomer thereof.

Further, each $R^2$, $R^4$, and $R^7$ can be independently methyl, ethyl, or n-propyl, each $R^5$ and $R^6$ are independently, a $C_1$ to $C_{10}$ alkyl group such as methyl, ethyl, propyl, butyl, pentyl, heptyl, hexyl, octyl, nonyl, decyl or an isomer thereof, $R^3$ is hydrogen, and $R^5$ and $R^6$ are joined together to form a 5-membered partially unsaturated ring.

In an aspect, each $R^2$, $R^4$ and $R^7$ are the same and are selected from the group consisting of $C_1$ to $C_3$ alkyl group such as methyl, ethyl, propyl, and isomers thereof, and $R^3$, $R^5$ and $R^6$ are hydrogen.

In an aspect, the VTP catalyst compound. $R^4$ is not an aryl group (substituted or unsubstituted). An aryl group is defined to be a single or multiple fused ring group where at least one ring is aromatic. A substituted aryl group is an aryl group where a hydrogen has been replaced by a heteroatom or heteroatom containing group. Examples of substituted and unsubstituted aryl groups include phenyl, benzyl, tolyl, carbazolyl, naphthyl, and the like. Likewise, in particular aspects, $R^2$, $R^4$ and $R^7$ are not a substituted or unsubstituted aryl group. In even further aspects, $R^2$, $R^4$, $R^5$, $R^6$ and $R^7$ are not a substituted or unsubstituted aryl group.

J can be represented by the formula (1a):

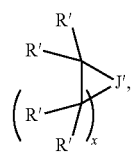

wherein J' is a carbon or silicon atom, x is 1, 2, 3, or 4, preferably 2 or 3, and each R' is, independently, hydrogen or $C_1$-$C_{10}$ hydrocarbyl, preferably hydrogen. Particular examples of J groups where J' is silicon include cyclopentamethylenesilylene, cyclotetramethylenesilylene, cyclotrimethylenesilylene, and the like. Particular examples of J groups where J' is carbon include cyclopropandiyl, cyclobutandiyl, cyclopentandiyl, cyclohexandiyl, and the like.

In an aspect, J can be represented by the formula $(R^a{}_2J')_n$ where each J' is independently C or Si, n is 1 or 2, and each $R^a$ is, independently, $C_1$ to $C_{20}$ substituted or unsubstituted hydrocarbyl, provided that two or more $R^a$ optionally can be joined together to form a saturated or partially saturated or aromatic cyclic or fused ring structure that incorporates at least one J'. Particular examples of J groups include dimethylsilylene, diethylsilylene, isopropylene, ethylene and the like.

For example, a VTP catalyst compound, bis-indenyl metallocene, useful in the present methods can have at least 90% rac isomer and the indenyl groups can be substituted at the 4 position with a $C_1$ to $C_{10}$ alkyl group, the 3 position is hydrogen, the bridge is carbon or silicon which is incorporated into a 4, 5 or 6 membered ring.

In addition, the VTP catalyst compound can be cyclotetramethylenesilylene-bis(2,4,7-trimethylinden-1-yl)hafnium dimethyl, shown below:

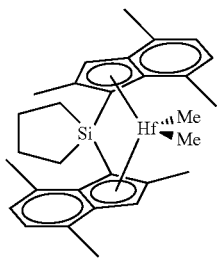

,

As noted, catalyst compounds useful in the present methods can be in rac or meso form. In one aspect, the catalyst compound is in the rac form. For instance, at least 90 wt % of the catalyst compound can be in the rac form, based upon the weight of the rac and meso forms present. More particularly, at least any one of about 92, 93, 94, 95, 96, 97, 98, and 99 wt % of the catalyst compound can be in rac form. In an aspect, all of the catalyst compound is in rac form.

Useful VTP catalyst compounds include metallocene catalysts, such as bridged group 4 transition metal (e.g, hafnium or zirconium, preferably hafnium) metallocene catalyst compounds having two indenyl ligands. Additional useful VTP catalyst compounds can include any one or more of: cyclotetramethylenesilylene-bis(2,4,7-trimethylinden-1-yl)hafnium dimethyl, cyclopentamethylenesilylene-bis(2,4,7-trimethylinden-1-yl)hafnium dimethyl, cyclotrimethylenesilylene-bis(2,4,7-trimethylinden-1-yl)hafnium dimethyl, cyclotetramethylenesilylene-bis(2,4-dimethylinden-1-yl) hafnium dimethyl, cyclopentamethylenesilylene-bis(2,4-dimethylinden-1-yl)hafnium dimethyl, cyclotrimethylenesilylene-bis(2,4-dimethylinden-1-yl)hafnium dimethyl, cyclotetramethylenesilylene-bis(4,7-dimethylinden-1-yl) hafnium dimethyl, cyclopentamethylenesilylene-bis(4,7-dimethylinden-1-yl)hafnium dimethyl, cyclotrimethylenesilylene-bis(4,7-dimethylinden-1-yl)hafnium dimethyl, cyclotetramethylenesilylene-bis(2-methyl-4-cyclopropylinden-1-yl)hafnium dimethyl, cyclopentamethylenesilylene-bis(2-methyl-4-cyclopropylinden-1-yl)hafnium dimethyl, cyclotrimethylenesilylene-bis(2-methyl-4-cyclopropylinden-1-yl)hafnium dimethyl, cyclotetramethylenesilylene-bis(2-ethyl-4-cyclopropylinden-1-yl)hafnium dimethyl, cyclopentamethylenesilylene-bis(2-ethyl-4-cyclopropylinden-1-yl)hafnium dimethyl, cyclotrimethylenesilylene-bis(2-ethyl-4-cyclopropylinden-1-yl)hafnium dimethyl, cyclotetramethylenesilylene-bis(2-methyl-4-t-butylinden-1-yl)hafnium dimethyl, cyclopentamethylenesilylene-bis(2-methyl-4-t-butylinden-1-yl)hafnium dimethyl, cyclotrimethylenesilylene-bis(2-methyl-4-t-butylinden-1-yl)hafnium dimethyl, cyclotetramethylenesilylene-bis(4,7-diethylinden-1-yl)hafnium dimethyl, cyclopentamethylenesilylene-bis(4,7-diethylinden-1-yl)hafnium dimethyl, cyclotrimethylenesilylene-bis(4,7-diethylinden-1-yl)hafnium dimethyl, cyclotetramethylenesilylene-bis(2,4-diethylinden-1-yl)hafnium dimethyl, cyclopentamethylenesilylene-bis(2,4-diethylinden-1-yl)hafnium dimethyl, cyclotrimethylenesilylene-bis(2,4-diethylinden-1-yl)hafnium dimethyl, cyclotetramethylenesilylene-bis(2-methyl-4,7-diethylinden-1-yl)hafnium dimethyl, cyclopentamethylenesilylene-bis(2-methyl-4,7-diethylinden-1-yl)hafnium dimethyl, cyclotrimethylenesilylene-bis(2-methyl-4,7-diethylinden-1-yl) hafnium dimethyl, cyclotetramethylenesilylene-bis(2-ethyl-4-methylinden-1-yl)hafnium dimethyl, cyclopentamethylenesilylene-bis(2-ethyl-4-methylinden-1-yl)hafnium dimethyl, cyclotrimethylenesilylene-bis(2-ethyl-4-methylinden-1-yl)hafnium dimethyl, cyclotetramethylenesilylene-bis(2-methyl-4-isopropylinden-1-yl)hafnium dimethyl, cyclopentamethylenesilylene-bis(2-methyl-4-isopropylinden-1-yl)hafnium dimethyl, cyclotrimethylenesilylene-bis(2-methyl-4-isopropylinden-1-yl)hafnium dimethyl, cyclotetramethylenesilylene-bis(4,6,8-trimethyl-1,2,3-trihydro-s-indacen-5-yl)hafnium dimethyl, cyclopentamethylenesilylene-bis(4,6,8-trimethyl-1,2,3-trihydro-s-indacen-5-yl)hafnium dimethyl, and cyclotrimethylenesilylene-bis(4,6,8-trimethyl-1,2,3-trihydro-s-indacen-5-yl)hafnium dimethyl.

Additional useful VTP catalyst compounds are listed and described in Paragraphs [0089] through [0090] of US Pub. App. 2015/0025209, now U.S. Pat. No. 9,458,254, incorporated herein by reference. Likewise, the VTP catalyst compounds can be synthesized via a variety of methods, including in accordance with procedures described in Paragraphs [0096] and [00247] through [00298] of US Pub. App. No. 2015/0025209, incorporated herein by reference.

The VTP catalyst use in the Examples of the invention is Cat 2, shown below:

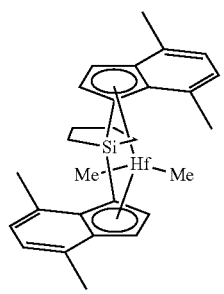

HMP Catalyst Systems

The HMP catalyst system includes a catalyst compound and an activator, and optionally, a support and co-activators. The HMP catalyst systems described herein are capable of making a high molecular weight polymer composition ("HMP polymer composition" or "HMP composition") having a molecular weight greater than 50,000 g/mol. The HMP polymer is a polymer or blend of polymers made up of one or more olefins including ethylene, alpha-olefins, cyclic olefins, and dienes. When a diene is present, it is preferably 5-ethylidene-2-norbornene. Preferably the monomers are ethylene and an alpha olefin such as 1-hexene, 1-butene or propene. In another preferred embodiment the monomers are ethylene, propylene and 5-ethylidene-2-norbornene.

HMP Catalyst Compounds

The HMP catalyst compound useful in the present methods can be any catalyst compound capable of producing high Mw copolymer and incorporating ethylene, alpha-olefins and optionally cyclic comonomers such as 5-ethylidene-2-norbornene.

Suitable catalyst compounds meeting these criteria include, for example, mono-Cp amido group 4 complexes, bridged fluorenyl-cyclopentadienyl group 4 complexes, biphenyl phenol (BPP) transition metal complexes, pyridyl amide transition metal complexes and/or pyridyl diamide transition metal complexes.

Suitable mono-Cp amido group 4 complexes include compounds of the following general structural formula (2):

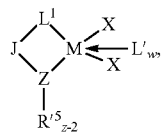

wherein: (1) M is a group 4 metal, preferably titanium; (2) $L^1$ is a divalent substituted or unsubstituted monocyclic or polycyclic arenyl ligand pi-bonded to M; (3) J is a divalent bridging group; (4) Z is a group 15 or 16 element with a coordination number of three if from group 15 or with a coordination number of two if from group 16 of the Periodic Table of Elements, and z is the coordination number of the element Z such that when Z is a group 16 element, z is 2 and $R'^5$ is absent; (5) $R'^5$ is a radical group which is a hydrocarbyl, substituted hydrocarbyl, halocarbyl, or substituted halocarbyl; (6) $L'_w$ is a neutral Lewis base and w represents the number of L' bonded to M where w is 0, 1, or 2, and optionally any L' and any X may be bonded to one another; and (7) each of the Xs are independently halogen radicals, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand. In some embodiments, both X may, independently, be a halogen, alkoxide, aryloxide, amide, phosphide or other univalent anionic ligand or both X can also be joined to form a anionic chelating ligand.

Suitable $L^1$ monocyclic or polycyclic arenyl ligands include substituted and unsubstituted cyclopentadienyl, indenyl, fluorenyl, heterocyclopentadienyl, heterophenyl, heteropentalenyl, heterocyclopentapentalenyl, heteroindenyls, heterofluorenyl, heterocyclopentanaphthyls, heterocyclopentaindenyls, heterobenzocyclopentaindenyls and the like.

In some embodiments, the mono-Cp amido group 4 complexes include compounds of the following general structural formula (2a):

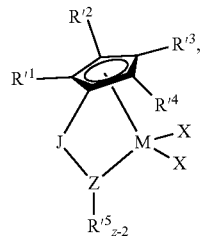

where: (1) J is a divalent bridging group comprising C, Si, or both; (2) M is a group 4 metal (for instance, Hf, Zr, or Ti, with Ti being preferred in certain embodiments); (3) each X is independently a univalent anionic ligand, or two Xs are joined and bound to the metal atom to form a metallocycle ring, or two Xs are joined to form a chelating ligand, a diene ligand, or an alkylidene ligand; (4) each $R'^1$, $R'^2$, $R'^3$, $R'^4$, and $R'^5$ is independently hydrogen, $C_1$-$C_{50}$ hydrocarbyl, substituted hydrocarbyl, halocarbyl, or substituted halocarbyl provided that any one or more of the pairs $R'^1$ and $R'^2$, $R'^2$ and $R'^3$, and $R'^3$ and $R'^4$, may optionally be bonded together to form a saturated or partially saturated cyclic or fused ring structure; and (5) Z is a group 15 or 16 element with a coordination number of three if from group 15 or with a coordination number of two if from group 16 of the Periodic Table of Elements, and z is the coordination number of the element Z. Preferably Z is N, O, S, or P, preferably N, O, or P, preferably N. When Z is a group 16 element, z is 2 and $R'^5$ is absent.

In certain embodiments, the bridging group, J, is represented by $R^*_2C$, $R^*_2Si$, $R^*_2CCR^*_2$, $R^*C=CR^*$, $R^*_2CSiR^*_2$, or $R^*_2SiSiR^*_2$, where each $R^*$ is, independently, hydrogen or a $C_1$ to $C_{20}$ containing hydrocarbyl, substituted hydrocarbyl, halocarbyl, or substituted halocarbyl and optionally two or more adjacent $R^*$ may join to form a substituted or unsubstituted, saturated, partially unsaturated or aromatic, cyclic or polycyclic substituent. In another embodiment, J is a bridging group comprising carbon and/or silicon atoms, such as dialkylsilyl, preferably J is selected from $CH_2$, $CH_2CH_2$, $C(CH_3)_2$, $SiMe_2$, $SiEt_2$, $SiPh_2$, $SiMePh$, $Ph_2C$, $(p\text{-}(Et)_3SiPh)_2C$, $Si(CH_2)_3$, $Si(CH_2)_4$ and $Si(CH_2)_5$.

Alternatively, J may be any of the compounds described for "J" in the VTP catalysts above.

In certain embodiments, each X is selected in accordance with the previously-described VTP catalyst compounds. That is, each X may independently be selected from the group consisting of hydrocarbyl radicals having from 1 to 20 carbon atoms, halogens, hydrides, amides, alkoxides, sulfides, phosphides, halides, dienes, amines, phosphines, ethers, and a combination thereof. Two Xs may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group. In specific embodiments, each X is a methyl group.

In some embodiments, each $R'^1$, $R'^2$, $R'^3$, $R'^4$, and $R'^5$ is independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH=CH_2$; $CH(CH_3)_2$; $CH_2CH(CH_3)_2$, $CH_2CH_2CH(CH_3)_2$, $C(CH_3)_2CH(CH_3)_2$; $CH(C(CH_3)_3)CH(CH_3)_2$; $C(CH_3)_3$; $CH_2Si(CH_3)_3$; $CH_2Ph$; $C_4H_7$; $C_5H_9$; $C_6H_{11}$; $C_7H_{13}$; $C_8H_{15}$; $C_9H_{17}$; $C_{12}H_{23}$, $C_{10}H_{15}$, C₆H₅; CH₂Si(CH₃)₃; CH₂CH=CH₂; CH₂CH₂CH=CH₂; CH₂CH₂(CF₂)₇CF₃; CF₃; N(CH₃)₂; N(C₂H₅)₂; and OC(CH₃)₃.

In particular embodiments, each of $R^{t1}$, $R^{t2}$, $R^{t3}$ and $R^{t4}$ is independently $C_1$-$C_{10}$ alkyl or hydrogen. For instance, each of $R^{t1}$, $R^{t2}$, $R^{t3}$, and $R^{t}4$ may be methyl or hydrogen. In specific embodiments, each of $R^{t1}$, $R^{t2}$, $R^{t3}$, and $R^{t4}$ is methyl (as is the case in an HMP catalyst compound according to some embodiments, dimethylsilylene(tetramethylcyclopentadienyl)(cyclododecylamido)titanium dimethyl). Alternatively, in other embodiments, one of $R^{t1}$, $R^{t2}$, $R^{t3}$ and $R^{t4}$ is hydrogen, the remaining $R^{t1}$, $R^{t2}$, $R^{t3}$ and $R^{t4}$ are each methyl, (as is the case in, e.g., dimethylsilylene(trimethylcyclopentadienyl)(cyclododecylamido)titanium dimethyl, a HMP catalyst compound according to other embodiments). In yet further embodiments, any of the pairs $R^{t1}$ and $R^{t2}$, $R^{t2}$ and $R^{t3}$, $R^{t3}$ and $R^{t4}$ may be bonded together so as to form, together with the cyclopentadienyl moiety to which those pairs are attached, an indenyl, s-indacenyl, or as-indacenyl group (as is the case, for instance, with dimethylsilylene(6-methyl-1,2,3,5-tetrahydro-s-indacen-5-yl)(tert-butylamido)titanium dimethyl, a HMP catalyst compound according to further embodiments).

In yet further example embodiments, Z is nitrogen, and $R^{t5}$ is selected from $C_1$-$C_{30}$ hydrocarbyl, substituted hydrocarbyl, halocarbyl, or substituted halocarbyl groups.

In further example embodiments, Z is nitrogen, and $R^{t5}$ is a $C_1$ to $C_{12}$ hydrocarbyl group such as methyl, ethyl, propyl (n- or iso-), butyl (n-, iso-, sec-, or tert-), etc. For instance, $R^{t5}$ may be tert-butyl. Alternatively, $R^{t5}$ in certain embodiments may be a cyclic group, e.g., adamantyl, cyclopropyl, cyclobutyl, cyclopentyl, cyclohexyl, cycloheptyl, cylcooctyl, cyclononyl, cyclodecyl, cylcododecyl, or norbornyl. Alternatively, $R^{t5}$ in certain embodiments may an aromatic group, e.g., phenyl, tolyl, naphthyl, anthracenyl, etc. In some embodiments, $R^{t5}$ is t-butyl and/or cyclododecyl, and preferably Z is N.

Particular examples of some suitable mono-Cp amido group 4 HMP catalyst compounds thus include: dimethylsilylene(tetramethylcyclopentadienyl)(cyclododecylamido)titanium dimethyl; dimethylsilylene(tetramethylcyclopentadienyl)(rert-butylamido)titanium dimethyl; dimethylsilylene(tetramethylcyclopentadienyl)(adamantylamido)titanium dimethyl; dimethylsilylene(tetramethylcyclopentadienyl)(cyclooctylamido)titanium dimethyl; dimethylsilylene(tetramethylcyclopentadienyl)(cyclohexylamido)titanium dimethyl; dimethylsilylene(tetramethylcyclopentadienyl)(norbornylamido)titanium dimethyl; dimethylsilylene(trimethylcyclopentadienyl)(cyclododecylamido)titanium dimethyl; dimethylsilylene(trimethylcyclopentadienyl)(adamantylamido)titanium dimethyl; dimethylsilylene(trimethylcyclopentadienyl)(tert-butylamido)titanium dimethyl; dimethylsilylene(6-methyl-1,2,3,5-tetrahydro-s-indacen-5-yl)(tert-butylamido)titanium dimethyl; dimethylsilylene(6-methyl-1,2,3,5-tetrahydro-s-indacen-5-yl)(adamantylamido)titanium dimethyl; dimethylsilylene(6-methyl-1,2,3,5-tetrahydro-s-indacen-5-yl)(cyclooctylamido)titanium dimethyl; dimethylsilylene(6-methyl-1,2,3,5-tetrahydro-s-indacen-5-yl)(cyclohexylamido)titanium dimethyl; dimethylsilylene(6-methyl-1,2,3,5-tetrahydro-s-indacen-5-yl)(cyclododecylamido)titanium dimethyl; dimethylsilylene(2,2,6-trimethyl-1,2,3,5-tetrahydro-s-indacen-5-yl)(adamantylamido)titanium dimethyl; dimethylsilylene(2,2,6-trimethyl-1,2,3,5-tetrahydro-s-indacen-5-yl)(cyclohexylamido)titanium dimethyl; dimethylsilylene(2,2,6-trimethyl-1,2,3,5-tetrahydro-s-indacen-5-yl)(cyclododecylamido)titanium dimethyl; dimethylsilylene(2, 2,6-trimethyl-1,2,3,5-tetrahydro-s-indacen-5-yl)(tert-butylamido)titanium dimethyl and any combination thereof.

As noted, other suitable HMP catalyst compounds may be characterized as bridged fluorenyl-cyclopentadienyl group 4 complexes. Suitable compounds according to such embodiments include compounds of the general formula (3):

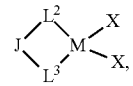

wherein: (1) M is a group 4 metal, preferably hafnium; (2) $L^2$ is a divalent substituted or unsubstituted fluorenyl, heterocyclopentapentalenyl, or heterofluorenyls ligand pi-bonded to M; (3) $L^3$ is a divalent cyclopentadienyl ring, a substituted cyclopentadienyl ring, a heterocyclopentadienyl ring, or a substituted heterocyclopentadienyl ligand pi-bonded to M; (4) J is a divalent bridging group; and (5) X are independently, halogen radicals, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together can be an olefin, diolefin or aryne ligand. In some embodiments, both X may, independently, be a halogen, alkoxide, aryl oxide, amide, phosphide or other univalent anionic ligand or both X can also be joined to form an anionic chelating ligand.

In some embodiments, the fluorenyl-cyclopentadienyl group 4 complexes include compounds of the general formula (3a):

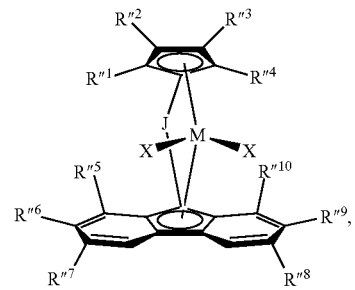

where: (1) J is a divalent bridging group comprising C, Si, or both; (2) M is a group 4 metal (for instance, Hf, Zr, or Ti, with Hf being preferred in certain embodiments); (3) each X is independently a univalent anionic ligand, or two Xs are joined and bound to the metal atom to form a metallocycle ring, or two Xs are joined to form a chelating ligand, a diene ligand, or an alkylidene ligand; and (4) each $R'''^1$, $R'''^2$, $R'''^3$, $R'''^4$, $R'''^5$, $R'''^6$, $R'''^7$, $R'''^8$, $R'''^9$, and $R'''^{10}$ is independently hydrogen, $C_1$-$C_{50}$ hydrocarbyl, substituted hydrocarbyl, halocarbyl, or substituted halocarbyl provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, may optionally be bonded together to form a saturated or partially saturated cyclic or fused ring structure. In certain embodiments, the bridging group, J, is represented by $R^*_2C$, $R^*_2Si$, $R^*_2CCR^*_2$, $R^*C=CR^*$, $R^*_2CSiR^*_2$, or $R^*_2SiSiR^*_2$, where each $R^*$ is, independently, hydrogen or a $C_1$ to $C_{20}$ containing hydrocarbyl or substituted hydrocarbyl and optionally two or more adjacent R* may join to form a substituted or unsubstituted, saturated, partially unsaturated or aromatic, cyclic or polycyclic substituent. In some embodiments J is a bridging group comprising carbon and/or silicon atoms, such as dialkylsilyl; preferably J is selected from $CH_2$, $CH_2CH_2$, $C(CH_3)_2$, $SiMe_2$, $SiEt_2$, $SiPh_2$, $SiMePh$, $Ph_2C$, $(p-(Et)_3SiPh)_2C$, $Si(CH_2)_3$, $Si(CH_2)_4$ and $Si(CH_2)_5$. Alternately J may be any of the compounds described for "J" in the VTP catalysts above.

In certain embodiments, each X is selected in accordance with the previously-described HMP compounds. That is, each X may independently be selected from the group consisting of hydrocarbyl radicals having from 1 to 20 carbon atoms, halogens, hydrides, amides, alkoxides, sulfides, phosphides, halides, dienes, amines, phosphines, ethers, and a combination thereof. Two Xs may form a part of a fused ring or a ring system. In particular embodiments, each X is independently selected from halides and $C_1$ to $C_5$ alkyl groups. For instance, each X may be a chloro, bromo, methyl, ethyl, propyl, butyl or pentyl group. In specific embodiments, each X is a methyl group.

In some embodiments, each $R'''^1$, $R'''^2$, $R'''^3$, $R'''^4$, $R'''^5$, $R'''^6$, $R'''^7$, $R'''^8$, $R'''^9$, and $R'''^{10}$ is independently selected from the following: H; $CH_3$; $CH_2CH_3$; $CH_2CH_2CH_3$; $CH_2(CH_2)_2CH_3$; $CH_2(CH_2)_{3-30}CH_3$; $CH_2C(CH_3)_3$; $CH=CH_2$; $CH(CH_3)_2$; $CH_2CH(CH_3)_2$; $CH_2CH_2CH(CH_3)_2$; $C(CH_3)_2CH(CH_3)_2$; $CH(C(CH_3)_3)CH(CH_3)_2$; $C(CH_3)_3$; $CH_2Si(CH_3)_3$; $CH_2Ph$; $C_4H_7$; $C_5H_9$; $C_6H_{11}$; $C_7H_{13}$; $C_8H_{15}$; $C_9H_{17}$; $C_6H_5$; $CH_2Si(CH_3)_3$; $CH_2CH=CH_2$; $CH_2CH_2CH=CH_2$; $CH_2CH_2(CF_2)_7CF_3$; $CF_3$; $N(CH_3)_2$; $N(C_2H_5)_2$; and $OC(CH_3)_3$.

In certain embodiments, any one or more of $R'''^1$, $R'''^2$, $R'''^3$, $R'''^4$, $R'''^5$, $R'''^6$, $R'''^7$, $R'''^8$, $R'''^9$, and $R'''^{10}$ may be hydrogen, methyl, ethyl, n-propyl, i-propyl, s-butyl, i-butyl, n-butyl, t-butyl, and so on for various isomers for $C_5$ to $C_{10}$ alkyls. In certain embodiments, $R'''^6$ and $R'''^9$ may be t-butyl. In some such embodiments, $R'''^1$, $R'''^2$, $R'''^3$, $R'''^4$, $R'''^5$, $R'''^7$, $R'''^8$, and $R'''^{10}$ may each be independently selected from H, methyl, and ethyl. In certain embodiments, each $R'''^1$-$R'''^{10}$ group other than $R'''^6$ and $R'''^9$ is H.

In particular embodiments, the fluorenyl-cyclopentadienyl group 4 complexes are represented by the following formula (3b):

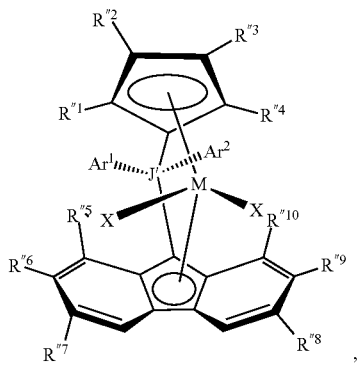

wherein M, X, $R'''^1$-$R'''^{10}$ are defined as above, J' is a silicon or carbon atom, and $Ar^1$ and $Ar^2$ are independently $C_6$-$C_{30}$ aryl or substituted aryl groups, wherein the substituents, independently, each occurrence are selected from the group consisting of hydrocarbyl, substituted hydrocarbyl, halocarbyl and substituted halocarbyl.

In certain embodiments, at least one of the $Ar^1$ and $Ar^2$ contains at least one hydrocarbylsilyl substituent group having the formula $R^{*'}_nSiR''_3$, where each R'' is independently a $C_1$-$C_{20}$ hydrocarbyl, substituted hydrocarbyl, halocarbyl, substituted halocarbyl, silylcarbyl, or substituted silylcarbyl substituent, $R^{*'}$ is a $C_1$-$C_{10}$ substituted or unsubstituted alkyl, alkenyl, and/or alkynyl linking group between Si and the aryl group, and n=0 or 1. For example, when n is 0, one or both of $Ar^1$ and $Ar^2$ may be trimethylsilylphenyl ($Me_3SiPh$), triethylsilylphenyl ($Et_3SiPh$), tripropylsilylphenyl ($Pr_3SiPh$), etc. Similarly, when n is 1, $R^{*'}$ is present as a linking group, for example a $C_2$ linking group (e.g., ethyl linking group), then one or both of $Ar^1$ and $Ar^2$ may be (trimethylsilyl)ethylphenyl ($Me_3SiCH_2CH_2Ph$), and so on.

Thus, for example, in embodiments wherein (1) $R'''^6$ and $R'''^9$ are each r-butyl as discussed above; (2) $R'''^1$-$R''^4$, $R'''^5$, $R'''^7$, $R'''^8$, and $R'''^{10}$ are each H, as also discussed above; (3) $Ar^1$ and $Ar^2$ are each $Et_3SiPh$; (4) J is C; (5) M is Hf; and (6) each X is methyl, an example HMP catalyst accordingly can be given as 1,1'-bis(4-triethylsilylphenyl)methylene-(cyclopentadienyl)(2,7-di-tert-butyl-fluoren-9-yl)hafnium dimethyl.

Particularly useful fluorenyl-cyclopentadienyl group 4 complexes include: dimethylsilylene(cyclopentadienyl)(2,7-di-tert-butyl-fluoren-9-yl)hafnium dimethyl, dimethylsilylene(cyclopentadienyl)(3,6-di-tert-butyl-fluoren-9-yl)hafnium dimethyl; diphenylmethylene(cyclopentadienyl)(2,7-di-tert-butyl-fluoren-9-yl)hafnium dimethyl; diphenylmethylene(cyclopentadienyl)(3,6-di-tert-butyl-fluoren-9-yl)hafnium dimethyl; isopropylidene(cyclopentadienyl)(2,7-di-tert-butyl-fluoren-9-yl)hafnium dimethyl; isopropylidene(cyclopentadienyl)(3,6-di-tert-butyl-fluoren-9-yl)hafnium dimethyl; dimethylsilylene(cyclopentadienyl)(2,7-dimethylfluoren-9-yl)hafnium dimethyl; dimethylsilylene(cyclopentadienyl)(3,6-dimethylfluoren-9-yl)hafnium dimethyl; diphenylmethylene(cyclopentadienyl)(2,7-dimethylfluoren-9-yl)hafnium dimethyl; diphenylmethylene(cyclopentadienyl)(3,6-dimethylfluoren-9-yl)hafnium dimethyl; dimethylsilylene(cyclopentadienyl)(fluoren-9-yl)hafnium dimethyl, isopropylidene(cyclopentadienyl)(fluoren-9-yl)hafnium dimethyl, diphenylmethylene(cyclopentadienyl)(fluoren-9-yl)hafnium dimethyl, and 1,1'-bis(4-triethylsilylphenyl)methylene(cyclopentadienyl)(2,7-di-tert-butyl-fluoren-9-yl)hafnium dimethyl.

The HMP catalyst used in the Examples of the invention is Cat 1, shown below:

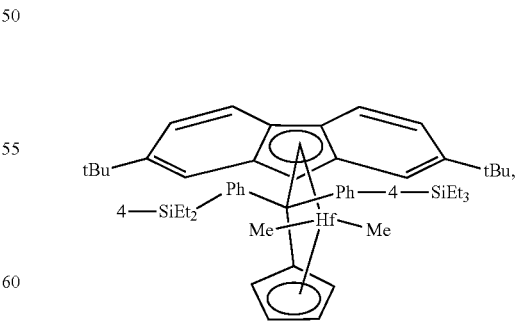

In yet further embodiments, suitable HMP catalyst compounds may be characterized as chelated transition metal complexes (type 1), such as those having the following structural formula (4):

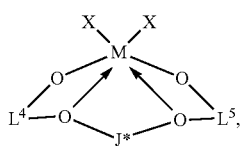

where: (1) J* is a divalent bridging group comprising C, Si, or both; (2) M is a group 4 metal, preferably hafnium and zirconium; (3) O is oxygen; (4) each X is independently a univalent anionic ligand, or two Xs are joined and bound to the metal atom to form a metallocycle ring, or two Xs are joined to form a chelating ligand, a diene ligand, or an alkylidene ligand; and (5) $L^4$ and $L^5$ are independently, a substituted monocyclic or polycyclic aromatic groups.

In some embodiments. J* is a divalent substituted or unsubstituted $C_{3-6}$ aliphatic or to cycloaliphatic group.

In some embodiments $L^4$ and $L^5$ are independently a monocyclic or polycyclic aromatic group substituted with any combination alkyl, aryl, alkoxy, or amino substituents which may optionally be substituted with halogens.

In yet further embodiments, suitable HMP catalyst compounds that are chelated transition metal complexes (type 1), may be characterized as biphenyl phenol transition metal complexes, such as those having the following structural formula (4a):

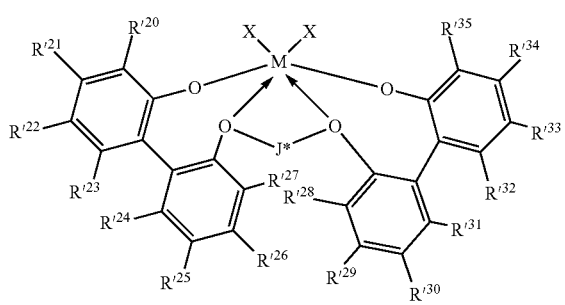

where: (1) J* is a divalent bridging group comprising C, Si, or both; (2) M is a group 4 metal, preferably hafnium and zirconium; (3) O is oxygen; (4) each X is independently a univalent anionic ligand, or two Xs are joined and bound to the metal atom to form a metallocycle ring, or two Xs are joined to form a chelating ligand, a diene ligand, or an alkylidene ligand; and (5) each $R'^{20}$, $R'^{21}$, $R'^{22}$, $R'^{23}$, $R'^{24}$, $R'^{25}$, $R'^{26}$, $R'^{27}$, $R'^{28}$, $R'^{29}$, $R'^{30}$, $R'^{31}$, $R'^{32}$, $R'^{33}$, $R'^{34}$, $R'^{35}$ is independently hydrogen, halo, $C_1$-$C_{50}$ hydrocarbyl, substituted hydrocarbyl, halocarbyl or substituted halocarbyl.

In particular embodiments, each $R'^{20}$ and $R'^{35}$ may be or may comprise a bulky substituent, such as substituted or unsubstituted aryl, carbazolyl, fluorenyl and/or anthracenyl.

In other particular embodiments, each $R'^{20}$ and $R'^{35}$ independently may be 3,5-di(isopropyl)phenyl, 3,5-di(isobutyl)phenyl, 3,5-di(tert-butyl)phenyl, carbazol-9-yl, 3,6-di-tert-butylcarbazol-9-yl, 2,3,4,5,6,7,8,9-octahydrocarbazol-1-yl, anthracen-9-yl, 1,2,3,4,5,6,7,8-octahydroanthracen-9-yl, naphthyl, fluoren-9-yl, 9-methylfluoren-9-yl, 1,2,3,4,5,6,7,8-octahydrofluoren-9-yl, or 9-methyl-1,2,3,4,5,6,7,8-octahydrofluoren-9-yl.

In other particular embodiments, $R'^{22}$ and $R'^{33}$ are independently $C_1$-$C_{10}$ hydrocarbyl, alternatively $C_1$-$C_{10}$ alkyls such as methyl, ethyl and all isomers of propyl, butyl, pentyl, hexyl, heptyl, octyl, nonyl and decyl.

In other particular embodiments, $R'^{25}$ and $R'^{30}$ are independently $C_1$-$C_{10}$ substituted or unsubstituted hydrocarbyl, halo, $C_1$-$C_{10}$ alkoxy, and $C_2$-$C_{20}$ dialkylamino. Alternatively $R'^{25}$ and $R'^{30}$ are independently $C_1$-$C_{10}$ alkyls such as methyl, ethyl and all isomers of propyl, butyl, pentyl, hexyl, heptyl, octyl, nonyl and decyl (including cyclic and linear or branched cyclic combinations); halogens such as fluoro, chloro, bromo; $C_1$-$C_{10}$ alkoxy such as methoxy, ethoxy, and all isomers of propoxy, butoxy, pentoxy, hexoxy, heptoxy, octoxy, nonoxy, and decoxy (including cyclic and linear or branched cyclic combinations); $C_2$-$C_{20}$ dialkylamino such as dimethyl amino, diethyl amino, and all isomers of dipropylamino, dibutylamino, dipentylamino, dihexylamino, diheptylamino, dioctylamino, dinonylamino, didecylamino (including cyclic and linear or branched cyclic combinations) and mixed alkyls such as methylethylamino, methylbutyl amino and the like.

In other particular embodiments, J* may be propan-1,3-diyl, butan-1,4-diyl, cyclohexanediyl, cyclohexen-4,5-diyl, or bis(methylene)cyclohexan-1,2-diyl.

Non-limiting examples of particularly useful biphenyl phenol transition metal complexes are illustrated below, wherein M is hafnium or zirconium and X is methyl, benzyl, or chloro:

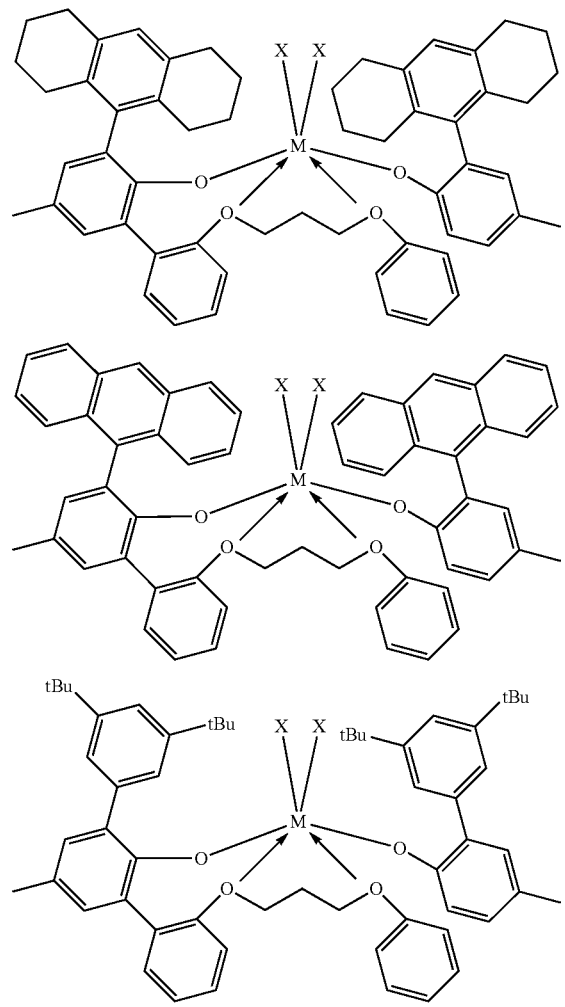

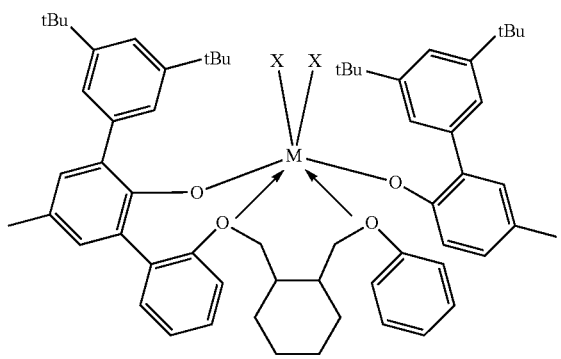

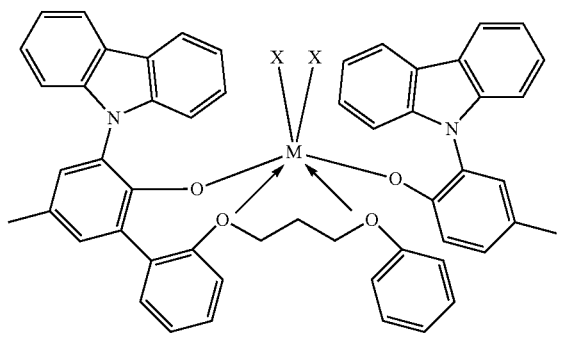

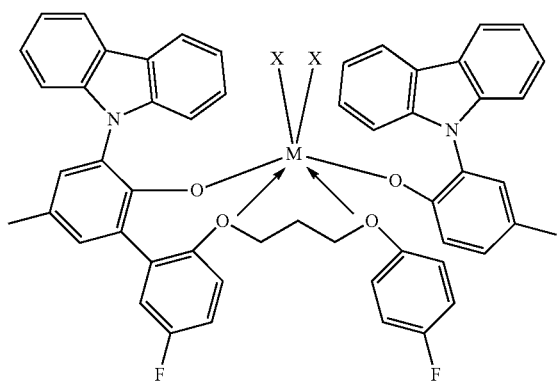

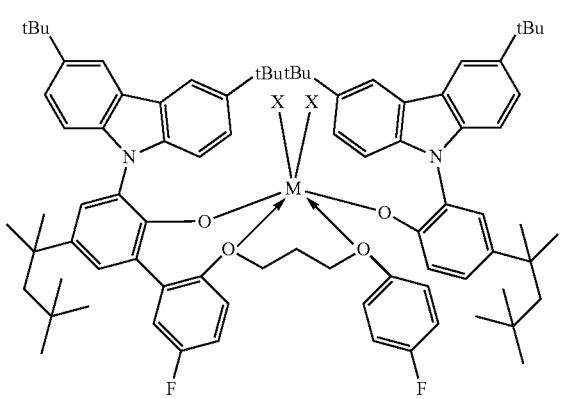

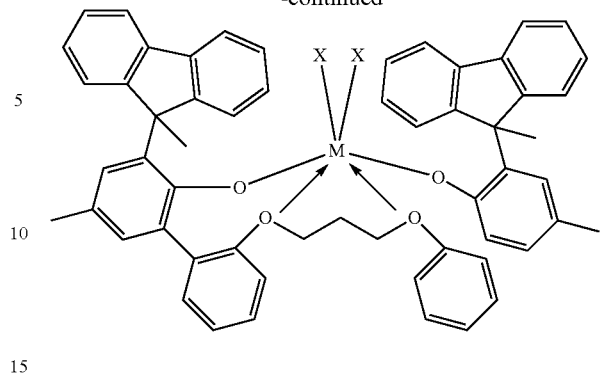

Additional particularly useful biphenyl phenol transition metal complexes are described in WO2003/091262, WO2005/108406, US2006/0025548, US2006/0052554, WO2007/136494, WO2007/136496, WO2007/136495, WO2009/064482, and WO2013/096573, and are incorporated by reference.

In yet further embodiments, suitable HMP catalyst compounds may be characterized as chelated transition metal complexes (type 2), such as those having the following structural formula (5):

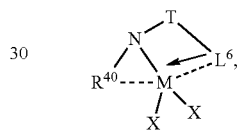

wherein (1) M is a group 4 metal, preferably hafnium; (2) $L^6$ is a $C_5$-$C_{20}$ heteroaryl group containing a Lewis base functionality, especially pyridine-2-yl or substituted pyridine-2-yl group or a divalent derivative thereof; (3) $R^{40}$ is selected from a $C_1$-$C_{30}$ alkyl, cycloalkyl, heteroalkyl, cycloheteroalkyl, aryl and substituted derivatives thereof or a divalent derivative thereof; (4) T is a divalent bridging group comprising carbon and or silicon, preferably a $C_1$-$C_{20}$ hydrocarbyl substituted methylene or silane group; (5) each X is independently a univalent anionic ligand, or two Xs are joined and bound to the metal atom to form a metallocycle ring, or two Xs are joined to form a chelating ligand, a diene ligand, or an alkylidene ligand; (6) N is nitrogen; and (7) bonds, optional bonds and dative bonds are represented by lines, dotted lines and arrows, respectively.

In yet further embodiments, suitable HMP catalyst compounds that are chelated transition metal complexes (type 2), may be characterized as pyridyl amide metal complexes, such as those having the following structural formula (5a):

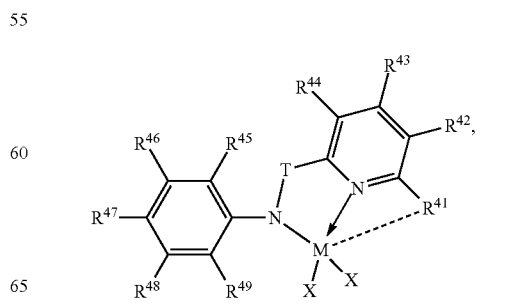

wherein M, T, N and X are as previously defined as in formula (5); each $R^{41}$, $R^{42}$, $R^{43}$, and $R^{44}$ are independently hydrogen, halo, or an alkyl, cycloalkyl, heteroalkyl, heterocycloalkyl, aryl or silyl group, or one or more adjacent $R^{41}$-$R^{44}$ may be joined together to form a fused ring derivative; $R^{45}$-$R^{49}$ are independently hydrogen, or $C_1$-$C_{10}$ alkyl, most preferably $R^{45}$ and $R^{49}$ are alkyl such as isopropyl or tert-butyl; T is preferably $CR'^{50}R'^{51}$ where $R'^{50}$ and $R'^{51}$ are independently hydrogen, halogen, a $C_1$-$C_{20}$ hydrocarbyl, most preferably, one of $R'^{50}$ and $R'^{51}$ is hydrogen and the other is a $C_6$-$C_{20}$ aryl group, especially 2-isopropyl, phenyl or a fused polycyclic aryl group, most preferably anthracenyl; and bonds, optional bonds and dative bonds are represented by lines, dotted lines and arrows, respectively.

Non-limiting examples of pyridyl amide catalysts that are chelated transition metal complexes (type 2) are illustrated below, wherein X is preferably methyl, benzyl or chloro:

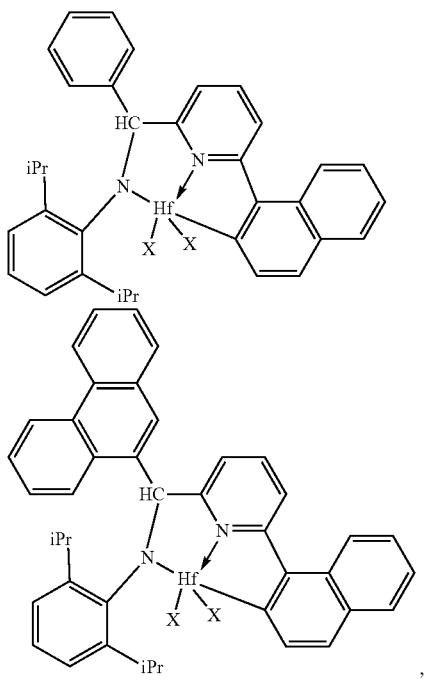

Additional particularly useful chelated transition metal complexes (type 2) including pyridyl amide transition metal complexes are described in WO2010/0227990, US2004/0220050, WO2004/026925, WO2004/024740, WO2004/024739, WO2003/040201, and WO2002/046249, WO2002/038628, and are incorporated by reference.

In yet further embodiments, suitable HMP catalyst compounds may be characterized as chelated transition metal complexes (type 3), such as those having the following structural formula (6):

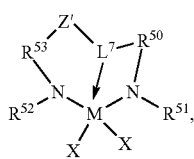

wherein (1) M is a group 4 metal, preferably hafnium; (2) N is nitrogen; (3) $L^7$ is a group that links $R^{50}$ to Z' by a three atom bridge with the central of the three atoms being a group 15 or 16 element that preferably forms a dative bond to M, and is a $C_5$-$C_{20}$ heteroaryl group containing a Lewis base functionality, especially a divalent pyridinyl or substituted pyridinyl group; (4) T is a divalent linker group, $(R^{56})_pC$—$C(R^{57})_q$, where $R^{56}$ and $R^{57}$ are independently selected from the group consisting of hydrogen, hydrocarbyls, substituted hydrocarbyls, and wherein adjacent $R^{56}$ and $R^{57}$ groups may be joined to form an aromatic or saturated, substituted or unsubstituted hydrocarbyl ring, wherein the ring has 5, 6, 7 or 8 ring carbon atoms and where the substituents on the ring can join to form additional rings, and p is 1 or 2 and q is 1 or 2; (5) $R^{50}$ and $R^{33}$ are each, independently, $ER^{54}R^{55}$ with E being carbon, silicon or germanium, and each $R^{54}$ and $R^{33}$ being independently selected from the group consisting of hydrogen, hydrocarbyls, substituted hydrocarbyls, alkoxy, silyl, amino, aryloxy, halogen and phosphino, and $R^{34}$ and $R^{33}$ may be joined to form a saturated heterocyclic ring, or a saturated substituted heterocyclic ring where substitutions on the ring can join to form additional rings; (6) $R^{31}$ and $R^{32}$ are independently selected from the group consisting of hydrocarbyls, substituted hydrocarbyls, silylcarbyls and substituted silylcarbyl groups; and (7) each X is independently a univalent anionic ligand, or two Xs are joined and bound to the metal atom to form a metallocycle ring, or two Xs are joined to form a chelating ligand, a diene ligand, or an alkylidene ligand.

In yet further embodiments, suitable HMP catalyst compounds that are chelated transition metal complexes (type 3), may be characterized as pyridyl diamide metal complexes, such as those having the following structural formula (6a):

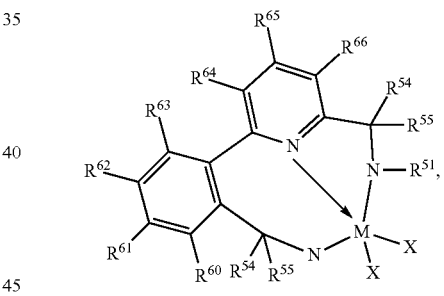

wherein M, X, N, $R^{51}$, $R^{52}$, $R^{54}$, and $R^{55}$ are as previously defined as in formula (6); $R^{60}$, $R^{61}$, $R^{62}$, $R^{63}$, $R^{64}$, $R^{65}$, $R^{66}$ are independently selected from the group consisting of hydrogen, hydrocarbyls, substituted hydrocarbyls, alkoxy, aryloxy, halogen, amino, and silyl, and wherein any one or more adjacent $R^{60}$-$R^{66}$ may be joined to form a substituted or unsubstituted hydrocarbyl or heterocyclic ring, wherein the ring has 5, 6, 7, or 8 ring atoms and where substitutions on the ring can join to form additional rings.

In an embodiment of the invention $R^{60}$ to $R^{66}$ are hydrogen.

In an embodiment of the invention $R^{62}$ is joined with $R^{63}$ to form a phenyl ring fused to the existing phenyl ring (e.g. a naphthyl group), and $R^{60}$, $R^{61}$, $R^{64}$, $R^{65}$, and $R^{66}$ are independently hydrogen or an alkyl group, preferably hydrogen.

In an embodiment of the invention each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups for $R^{54}$ or $R^{55}$ include phenyl, 2-methylphenyl, 2-ethylphenyl, 2-isopropylphenyl, and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In yet further embodiments, suitable HMP catalyst compounds that are chelated transition metal complexes (type 3), may be characterized as pyridyl diamide metal complexes, such as those having the following structural formula (6b):

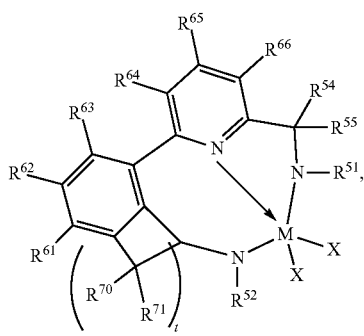

wherein M, X, N, $R^{51}$, $R^{52}$, $R^{54}$, $R^{55}$, $R^{61}$-$R^{66}$ are as previously defined as in formulae (6) and (6a); each $R^{70}$-$R^{71}$ are independently selected from the group consisting of hydrogen, hydrocarbyls, substituted hydrocarbyls, alkoxy, aryloxy, halogen, amino, and silyl, and wherein any one or more adjacent $R^{70}$-$R^{71}$ may be joined to form a substituted or unsubstituted hydrocarbyl or heterocyclic ring, wherein the ring has 5, 6, 7, or 8 ring atoms and where substitutions on the ring can join to form additional rings, and t is 2 or 3 (corresponding to cyclopentyl and cyclohexyl rings, respectively).

In an embodiment of the invention $R^{61}$-$R^{66}$ are hydrogen.

In an embodiment of the invention each $R^{70}$ and $R^{71}$ are independently hydrogen, and t is 2 or 3, preferably 2.

In an embodiment of the invention each $R^{54}$ and $R^{55}$ are independently hydrogen, an alkyl group or an aryl group or substituted aryl group; preferably one or both $R^{54}$ or $R^{55}$ is hydrogen, or one $R^{54}$ or $R^{55}$ is hydrogen and the other is an aryl group or substituted aryl group. Preferred but non limiting aryl groups include phenyl and 2-methylphenyl, 2-ethylphenyl, 2-isopropylphenyl and naphthyl.

In an embodiment of the invention, $R^{52}$ and $R^{51}$ are independently aryl or substituted aryl; preferably $R^{51}$ is a substituted phenyl group such as, but not limited to 2,6-diisopropylphenyl, 2,6-diethylphenyl, 2,6-dimethylphenyl, mesityl, and the like, and preferably $R^{52}$ is phenyl or a substituted phenyl group such as, but not limited to 2-tolyl, 2-ethylphenyl, 2-propylphenyl, 2-trifluoromethylphenyl, 2-fluorophenyl, mesityl, 2,6-diisopropylphenyl, 2,6-diethylphenyl, 2,6-dimethylphenyl, 3,5-di-tert-butylphenyl, and the like.

In an embodiment of the invention, $R^{54}$, $R^{55}$, $R^{61}$-$R^{66}$, each $R^{70}$-$R^{71}$ are hydrogen, $R^{52}$ is phenyl, $R^{51}$ is 2,6-diisopropylphenyl and t is 2.

Non-limiting examples of pyridyl diamide catalysts that are chelated transition metal complexes (type 3) are illustrated below, wherein X is methyl, benzyl, or chloro:

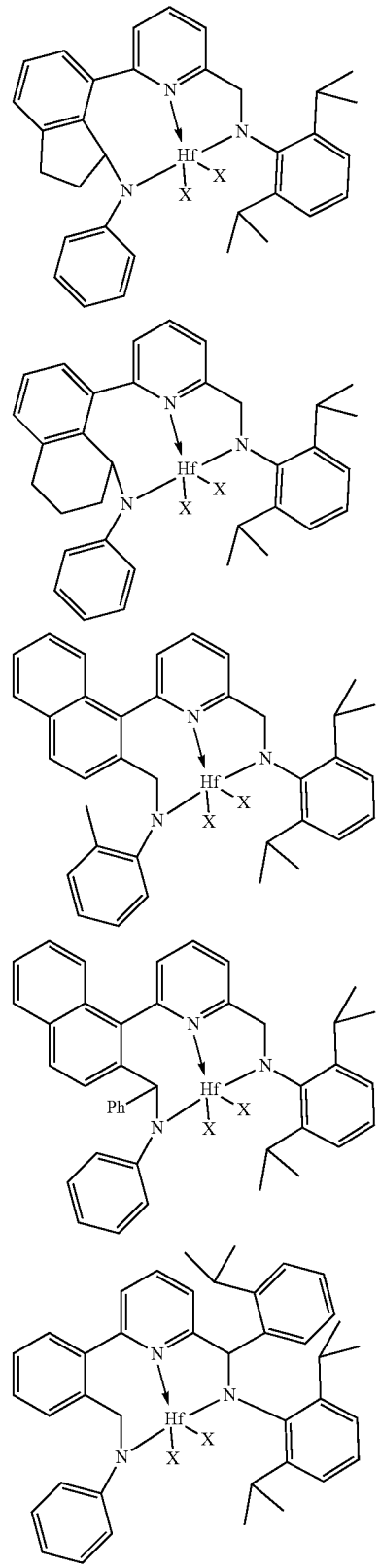

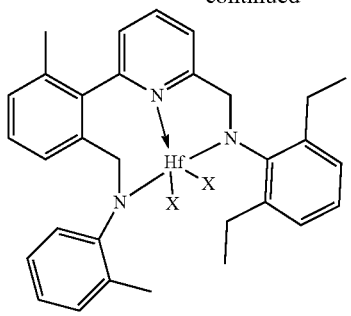

Additional particularly useful chelated transition metal complexes (type 3) including pyridyl diamide transition metal complexes are described in US2014/0316089, WO2012/134614, WO2012/134615, WO2012/134613, US2012/0071616, US2011/0301310, and US2010/0022726 and are incorporated by reference.

As noted previously, the HMP catalyst system further comprises an activator, as well as optional support and co-activator(s). Suitable activators, optional supports, and optional co-activator(s) are discussed in greater detail below.

The First Polymer Composition and the Second Polymer Composition

As described herein, methods of making blended polymer compositions having high elasticity are provided herein. The present methods comprise the steps of producing a first polymer composition using a VTP catalyst system, producing a second polymer composition using a HMP catalyst system and combining the first polymer composition and the second polymer composition to make the blended polymer composition. The present methods include blending/combining the polymer compositions produced by different catalyst systems. One such catalyst system includes (i) a vinyl-terminated polymer ("VTP") catalyst system comprising a VTP catalyst compound (referred to herein also as a "VTP catalyst") and one or more activators. Another catalyst system includes a high molecular-weight polymer ("HMP") catalyst system comprising a HMP catalyst compound (referred to herein also as a "HMP catalyst") and one or more activators. The activators of these different catalyst systems can be the same or different in whole or in part.

In an aspect the polymer compositions and/or polymerization processes utilize ethylene, propylene, and 5-ethylidene-2-norbornene monomers (e.g., the processes produce, and/or the polymer composition comprises or consists of, an ethylene-propylene-5-ethylidene-2-norbornene terpolymers) In such instances, the diene content is preferably less than any one of 15, 10, 5, 1, and 0.1 wt % of the total weight of the ethylene terpolymer.

Each of the polymer compositions, the first polymer composition, the second polymer composition and the blended polymer composition, can be produced from a plurality of monomers the include ethylene and propylene, and ethylene-propylene (EP) copolymers. Alternatively the polymer compositions can be produced from ethylene monomers and homopolypropylene or ethylene-propylene copolymer VTPs; or from propylene monomers and homopolyethylene or ethylene-propylene VTPs; etc). Copolymers can optionally include units derived from a diene monomer as well (e.g., as a third, fourth, or other monomer, and/or incorporated into the VTP), such that polymers formed can be designated as EP(D)M polymers, indicating the optional inclusion of diene-derived units. Where such diene-derived units are indeed present, the copolymer can be characterized as an EPDM copolymer. Furthermore, EP(D)Ms and/or EPDMs can be formed from a plurality of monomers including another α-olefin comonomer, such as 1-butene, in addition to the propylene comonomer. In an aspect, at least 50% of the VTPs can have at least one chain-end unsaturation (of any kind).

As provided herein, the blended polymer composition will have Mw between 5,000 and 1,000,000 g/mol and preferably between 50,000 and 700,000 and even more preferably between 100,000 and 500,000 g/mol. The MWD (Mw/Mn) of the blends will preferably be greater than 2.6 and more preferably >2.8 and even more preferably 3 or greater. Blends display improved rheological properties such as high viscosity at low shear rates and low viscosity at high shear rates. The small angle oscillatory sheer rheology of the blended polymers preferably has Tan(δ), the ratio of the loss and storage moduli (G"/G') at 0.245 s$^{-1}$≤1.1 and more preferably Tan(δ)≤1 and even more preferably Tan(δ)≤0.9 at either 100 or 125° C. Another characteristic of blended polymers is a Sheer Thinning Ratio (complex viscosity at 0.1 Rad/s)/(complex viscosity at 128 Rad/s) preferably >70 and more preferably >100 and in some embodiments 150 or greater at either 100 or 125° C. A further characteristic of blended polymers is a low frequency at which the storage and loss moduli are equivalent. In preferred embodiments G"/G'=1 at <1.8 Rad/s and in more preferred embodiments G"/G'=1 at <0.9 Rad/s and in even more preferred embodiments, G"/G'=1 at <0.5 Rad/s at either 100 or 125° C. In some even more preferred embodiments, G"/G'=1 at <0.1 Rad/s at either 100 or 125° C. In this latter case, plots of G' and G" versus frequency for blends do not cross between 0.1 and 128 Rad/s. As such the blend can have a sheer thinning ratio (complex viscosity at 0.1 Rad/s)/(complex viscosity at 128 Rad/s) of >70 and preferably >100 and even more preferably >125. In some embodiments, the blend may have a sheer thinning ratio of 150 or greater at either 100 or 125° C. An additional characteristic of blended polymers is a phase angle below 50° and preferably below 45° and even more preferably below 40° when G*=100,000 Pa at 100 or 125° C. The blended polymer compositions can be characterized as the blend of the reaction products of each of the first polymerization process and the second polymerization process, Polymerization Processes Processes according to other aspects include at least two polymerizations (using the VTP catalyst system and HMP catalyst system). In making the first polymer composition or second polymer composition, such aspects employ parallel polymerization (e.g., VTP polymerization and HMP polymerization in parallel, with products of each polymerization then being blended.

For example, polymerization processes according to some of these aspects include: contacting in one reactor (i) a VTP, (ii) one or more $C_2$-$C_{20}$ α-olefin monomers, and optionally (iii) one or more dienes, to form the VTP polymer composition and in a second reactor (iv) a HMP, (v) one or more $C_2$-$C_{20}$ α-olefin monomers, and optionally (vi) one or more dienes, to form the HMP polymer composition. In particular aspects, the $C_2$-$C_{20}$ α-olefin monomer is ethylene, and the VTP polymer composition is composed of units derived from one or more of ethylene, propylene, and, optionally, one or more dienes. In further aspects, the one or more monomers further comprise a second $C_3$-$C_{20}$ α-olefin comonomer, such as propylene or 1-butene.

Parallel polymerization can include, for instance, a first polymerization zone comprising a VTP catalyst system to produce the first polymer composition (comprising, e.g., one or more VTPs), and a second polymerization zone comprising a HMP catalyst system to produce the second polymer composition (comprising, e.g., one or more HMP catalysts). At least a portion of each of the first polymer composition and second polymer composition are then blended together or otherwise combined to form the blend polymer composition.

Each of the polymerization processes described herein can be carried out using variety of polymerization technique. For example, suspension, homogeneous, bulk, solution, slurry, or gas phase polymerization process can be used Such processes can be run in a batch, semi-batch, or continuous mode. Homogeneous polymerization processes and slurry processes are useful.

Furthermore, although known polymerization techniques can be employed, processes according to certain aspects utilize particular conditions (e.g, temperature and pressure). Temperatures and/or pressures generally can include a temperature in the range of from about 0° C. to about 300° C. Example ranges include ranges from a low of any one of about 20, 30, 35, 40, 45, 50, 55, 60, 65, and 70° C. to a high of any one of about 100, 110, 120, 130, 140, 150, 160, 170, 180, 190, 200, 250, and 300° C. For example, polymerization temperatures can fall within the range of from about 40° C. to about 200° C., alternatively from about 45° C. to about 150° C., 70° C. to about 150° C., or, in particular aspects, from about 70° C. to about 125° C. Pressure can depend on the desired scale of the polymerization system. For instance, in some polymerizations, pressure can generally range from about ambient pressure to 200 MPa. In various such aspects, pressure can range from a low of any one of about 0.1, 1, 5, and 10 to a high of any one of about 3, 5, 10, 50, 100, 150, and 200 MPa, provided the high end of the range is greater than the low end. According to such aspects, pressure is preferably in a range of about 2 to about 70 MPa.

Polymerization Process Components

Each of the polymerization processes described herein employ either an HMP catalyst system or a VTP catalyst system as described herein. As previously described, each catalyst system in general comprises its respective catalyst compound and one or more activators (which can be the same or different). The polymerization processes include contacting a plurality of monomers with the HMP catalyst system or the VTP catalyst system, or contacting a suitable VTP, along with one or more additional monomers, with the HMP catalyst system. VTPs can be produced by a VTP catalyst system. Similarly, the HMP catalyst system produces HMPs, which in some aspects can further incorporate a VTP into the HMP structure to form long chain branched architecture.

In general, VTP catalyst systems include a VTP catalyst compound and an activator. VTP catalyst systems can further optionally include, but are not limited or constrained to, a support and/or one or more co-activators. Various activators, co-activators, and supports can be the same or different for both the VTP and HMP catalysts, and therefore such components of catalyst systems are described in more detail with respect to both catalysts below.

In polymerization processes, metallocene catalyst systems can produce polymer compositions having an unsaturated chain end that can incorporate in a growing chain and form long chain branches See, for example, EP495099 and EP608369. As a result, various polymerization processes are designed to produce long-chain branched metallocene polymer compositions. See, U.S. Pat. No. 4,814,540, JP 2005-336092 A2; US 2012-0245311 A1, Rulhoff et al. in 16 Macromolecular Chemistry and Physics 1450-1460 (2006), Kaneyoshi et al. in 38 Macromolecules 5425-5435 (2005); Teuben et al. 62 J. Mol. Catal. 277-287 (1990); X. Yang et al., 31 Angew. Chem Inti Ed. Engl. 1375-1377 (1992); Resconi et al. in 114 J. Am. Chem Soc. 1025-1032 (1992); Small and Brookhart 32 Macromolecules 2120-2130 (1999); Weng et al., 21 Macromol Rapid Comm. 1103-1107 (2000); 33 Macromolecules 8541-8548 (2000); Moscardi et al. in 20 Organometallics 1918-1931 (2001); Coates et al. in 38 Macromolecules 6259-6268 (2005); Rose et al. 41 Macromolecules 559-567 (2008); Zhu et al., 35 Macromolecules 10062-10070 (2002) and 24 Macromolecules Rap. Commun. 311-315 (2003), Janiak and Blank in 236 Macromol. Symp. 14-22 (2006).

α-Olefin Monomers and Dienes

As described herein, each polymer compositions (the first polymer composition, the second polymer composition, and the blended composition) can be made from at least a portion of a plurality of monomers. The plurality of monomers can comprise: (1) a first $C_2$-$C_{20}$ α-olefin; (2) a second $C_2$-$C_{20}$ α-olefin different from the first; and, optionally, (3) one or more dienes. For example, in an aspect, the plurality of monomers comprises: (1) ethylene; (2) a second $C_3$-$C_{20}$ α-olefin such as propylene and/or butene, and (3) one or more dienes. Also, each polymer composition (the first polymer composition, the second polymer composition, and the blended polymer composition) can comprise polymers made of one or more monomers including homopolymers, copolymers, or both.

The polymerization processes used to make the first polymer composition and the second polymer composition can utilize one or more monomers as reactants (e g, to be contacted with the HMP catalyst system or the VTP catalyst system). Each of the one or more monomers used in polymerization process (and/or included in the polymer compositions) useful in the present methods is independently selected from $C_2$-$C_{40}$ α-olefins, preferably $C_2$ to $C_{20}$ α-olefins, more preferably $C_2$ to $C_{12}$ α-olefins (e.g., ethylene, propylene, butene, pentene, hexene, heptene, octene, nonene, decene, undecene, dodecene and isomers thereof).

By way of example, in certain aspects, the one or more monomers include both a first $C_2$-$C_{12}$ α-olefin and a second $C_2$-$C_{12}$ α-olefin different from the first. In particular of these aspects, the first monomer is ethylene, and the second monomer is an α-olefin other than ethylene. For instance, the second monomer can be a $C_3$-$C_{12}$ or $C_3$-$C_8$ α-olefin, such as one of those identified previously. In an aspect, the second monomer is propylene, butene (e.g., 1-butene), or hexene (e.g., 1-hexene) Further, the one or more monomers can include both propylene and butene in addition to the ethylene.

Exemplary $C_2$ to $C_{40}$ α-olefin and cyclic olefin monomers and comonomers include ethylene, propylene, butene, pentene, hexene, heptene, octene, nonene, decene, undecene, dodecene, norbornene, cyclopentene, cycloheptene, cyclooctene, cyclododecene, 7-oxanorbornene, substituted derivatives thereof, and isomers thereof, preferably hexene, heptene, octene, nonene, decene, dodecene, cyclooctene, 1-hydroxy-4-cyclooctene, 1-acetoxy-4-cyclooctene, 5-methylcyclopentene, cyclopentene, and any combination thereof.

The plurality of monomers can further include one or more dienes. Suitable diene monomers include any hydrocarbon structure, preferably $C_4$ to $C_{30}$, having at least two unsaturated bonds. Preferably the diene is a nonconjugated diene with at least two unsaturated bonds, wherein one of the unsaturated bonds is readily incorporated into a polymer.

The second bond can partially take part in polymerization to form cross-linked polymers but normally provides at least some unsaturated bonds in the polymer product suitable for subsequent functionalization (such as with maleic acid or maleic anhydride), curing or vulcanization in post polymerization processes Examples of dienes include, but are not limited to butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and poly butadienes having a molecular weight ($M_w$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; methyl-tetrahydroindene; dicyclopentadiene; bicyclo-(2.2.1)-hepta-2,5-diene; 2,5-norbornadiene; and alkenyl-, alkylidene-, cycloalkenyl-, and cylcoalkyliene norbornenes [including, e.g., 5-methylene-2-norbornene, 5-ethylidene-2-norbornene (ENB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene. 5-ethylidene-2-norbornene (ENB) is a preferred diene in particular aspects.

The diene monomers can have at least two polymerizable unsaturated bonds that can be incorporated into polymers to form cross-linked polymers. A polymerizable bond of a diene is referred as to a bond which can be incorporated or inserted into a polymer chain during the polymerization process of a growing chain. For polymerization using metallocene catalysts, examples of such dienes include α,ω-dienes (such as butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene) and certain multi-ring alicyclic fused and bridged ring dienes (such as tetrahydroindene; 7-oxanorbornadiene, dicyclopentadiene; bicyclo-(2.2.1)-hepta-2,5-diene; 5-vinyl-2-norbornene; 3,7-dimethyl-1,7-octadiene; 1,4-cyclohexadiene; 1,5-cyclooctadiene; 1,7-cyclododecadiene and vinyl cyclohexene). In an aspect, in certain polymer compositions (and/or processes for making them), the content of diene with at least two polymerizable bonds in the inventive polymer composition is less than 0.5 wt %, preferably less than 0.1 wt % of the copolymer.

Noteworthy, 5-ethylidene-2-norbornene ("ENB") has two unsaturated bonds but is only one of them is polymerizable in a metallocene system. During polymerization, 5-ethylidene-2-norbornene is incorporated into a growing polymer chain through the endocyclic double bond only; leaving the exocyclic double bond unreacted. Since it is unreactive during the polymerization, no reactor crosslinking can occur. The unreacted double bond is available for use (e.g., cross-linking and functionalization) post-reactor. In some embodiments, then, the polymer composition is free of dienes having at least two polymerizable bonds (and/or copolymerization processes result in such a polymer composition). Such polymer (and/or polymer compositions incorporating such copolymer) is free of cross-linked architecture with tetra-functionality and a gel-free product.

Catalyst System Activators

The cocatalyst or activator convert the neutral catalyst compound to a catalytically active catalyst compound cation. Non-limiting activators include alumoxanes, aluminum alkyls, ionizing activators, which can be neutral or ionic, and conventional-type cocatalysts. Particular activators include alumoxane compounds, modified alumoxane compounds, and ionizing anion precursor compounds that abstract a reactive, σ-bound, metal ligand making the metal complex cationic and providing a charge-balancing noncoordinating or weakly coordinating anion.

Activators for Catalyst Systems

The terms "cocatalyst" and "activator" are used herein interchangeably.

The catalyst systems described herein typically comprises a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts Preferred activators typically include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g. a non-coordinating anion.

Alumoxane Activators

Alumoxane activators are utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethyl alumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), some embodiments select the maximum amount of activator typically at up to a 5000-fold molar excess Al/M over the catalyst compound (per metal catalytic site). The minimum activator-to-catalyst-compound is a 1:1 molar ratio. Alternate preferred ranges include from 1:1 to 500:1, alternately from 1.1 to 200:1, alternately from 1:1 to 100:1, or alternately from 1:1 to 50:1.

In an alternate embodiment, little or no alumoxane is used in the polymerization processes described herein. Preferably, alumoxane is present at zero mole %, alternately the alumoxane is present at a molar ratio of aluminum to catalyst compound transition metal less than 500:1, preferably less than 300:1, preferably less than 100:1, preferably less than 1:1.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this invention to use an ionizing activator, neutral or ionic. It is also within the scope of this invention to use neutral or ionic activators alone or in combination with alumoxane or modified alumoxane activators. For descriptions of useful activators please see U.S. Pat. Nos. 8,658,556 and 6,211,105.

Preferred activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4$$^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In a preferred embodiment, the activator comprises a triaryl carbonium (such as triphenylcarbenium tetraphenylborate, triphenylcarbenium tetrakis(pentafluorophenyl)borate, triphenylcarbenium tetrakis-(2,3,4,6-tetrafluorophenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl)phenyl)borate).

In another embodiment, the activator comprises one or more of trialkylammonium tetrakis(pentafluorophenyl)borate, N,N-dialkylanilinium tetrakis(pentafluorophenyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl)borate, trialkylammonium tetrakis(perfluorobiphenyl)borate, N,N-dialkylanilinium tetrakis(perfluorobiphenyl)borate, trialkylammonium tetrakis(3,5-bis(trifluoromethyl)phenyl)borate, N,N-dialkylanilinium tetrakis(3,5-bis(trifluoromethyl)phenyl)borate, N,N-dialkyl-(2,4,6-trimethylanilinium) tetrakis(3,5-bis(trifluoromethyl)phenyl)borate, di-(i-propyl)ammonium tetrakis(pentafluorophenyl)borate, (where alkyl is methyl, ethyl, propyl, n-butyl, sec-butyl, or t-butyl).

In an embodiment the present invention, the activator is represented by the formula:

$(Z)_d^+(A^{d-})$, wherein Z is (L-H) or a reducible Lewis Acid, L is an neutral Lewis base; H is hydrogen; (L-H)$^+$ is a Bronsted acid, A$^{d-}$ is a non-coordinating anion having the charge d−; and d is an integer from 1 to 3, preferably Z is (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl.

The typical activator-to-catalyst ratio, e.g., all NCA activators-to-catalyst ratio is about a 1:1 molar ratio. Alternate preferred ranges include from 0.1:1 to 100:1, alternately from 0.5:1 to 200:1, alternately from 1:1 to 500:1 alternately from 1:1 to 1000.1. A particularly useful range is from 0.5:1 to 10:1, preferably 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 94/07928; and WO 95/14044 (the disclosures of which are incorporated herein by reference in their entirety) which discuss the use of an alumoxane in combination with an ionizing activator).

Useful chain transfer agents are typically alkyl alumoxanes, a compound represented by the formula AlR$_3$, ZnR$_2$ (where each R is, independently, a C$_1$-C$_8$ aliphatic radical, preferably methyl, ethyl, propyl, butyl, phenyl, hexyl octyl or an isomer thereof) or a combination thereof, such as diethyl zinc, methylalumoxane, trimethylaluminum, triisobutylaluminum, trioctylaluminum, or a combination thereof.

Activators can be mixed together before or after combination with the catalyst compound, preferably before being mixed with either or both of the HMP and VTP catalyst compounds. In some aspects, the same activator or mix of activators can be used for both the HMP and VTP catalyst compounds. In other aspects, however, different activators or mixtures of activators can be used for each of the HMP and VTP catalyst compounds.

In an aspect, the activators) is/are contacted with a catalyst compound to form the catalyst system comprising activated catalyst and activator or other charge-balancing moiety, before the catalyst system is contacted with one or more monomers. Alternatively, the activator(s) can be co-fed to catalyst compound(s) together with one or more monomers. If both the HMP catalyst system and VTP catalyst system are utilized in one polymerization zone (e.g., in a process using a multiple catalyst system such as a dual catalyst system), each of the catalysts can be contacted with one or more activator(s) (which, again, can be the same or different) before being mixed together. Where the same activator is used for each, the HMP catalyst and the VTP catalyst can be contacted with activator (either before or along with feeding of monomers to the catalyst mixture).

Optional Scavengers or Co-Activators

In addition to the activator compounds, scavengers or co-activators can be used in either or both of the HMP and VTP catalyst systems. Aluminum alkyl or organoaluminum compounds which can be utilized as scavengers or co-activators include, for example, trimethylaluminum, triethylaluminum, triisobutylaluminum, tri-n-hexylaluminum, tri-n-octylaluminum and the like. Other oxophilic species such as diethyl zinc can be used.

Optional Support Materials

Either or both HMP catalyst system and VTP catalyst system can comprise an inert support material. The support material can be a porous support material, for example, talc, and inorganic oxides. Other support materials include zeolites, clays, organoclays, or any other organic or inorganic support material and the like, or mixtures thereof.

The support material can be an inorganic oxide in a finely divided form. Suitable inorganic oxide materials for use in HMP and/or VTP catalyst systems herein include groups 2, 4, 13, and 14 metal oxides, such as silica, alumina, and mixtures thereof. Other inorganic oxides that can be employed either alone or in combination with the silica, or alumina are magnesia, titania, zirconia, and the like. Other suitable support materials, however, can be employed, for example, finely divided functionalized polyolefins, such as finely divided polyethylene. Some aspects can employ any support, and/or methods for preparing such support, as described at Paragraphs [00108] through 00114 in US Pub. App. No. 2015/0025210, issued as U.S. Pat. No. 9,458,260, incorporated herein by reference.

VTP Compositions

VTP compositions provided herein can include ethylene-derived units in an amount ranging from a low of any one of about 25, 30, 35, 40, 45, 50, 55, 60, 65, and 70 wt % to a high of any one of about 30, 35, 40, 45, 50, 55, 60, 65, 70, 75, 80, 85, 90, 95, and 100 wt %, provided that the high end of the range is greater than the low end. Further, where VTPs can include one or more diene-derived units, the VTP compositions can include diene-derived units in an amount ranging from a low of any one of about 0.1, 0.2, 0.3, 0.4, 0.5, 0.6, 0.7, 0.8, 0.9, 1, 2, 3, 4, 5, 6, 7, 8, 9, and 10 wt % to a high of any one of about 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 wt %, provided that the high end of the range is greater than the low end. The balance of the VTP composition can be units derived from one or more $C_3$-$C_{12}$ α-olefins. In an aspect, the balance of the VTP composition can be made up of propylene-derived units, 1-butene-derived units, 1-hexene-derived units, 1-octene-derived units or a combination thereof.

VTP compositions can have an Mw of about 5,000 to about 500,000 g/mol. Particular VTPs can have Mw within the range from a low of any one of 5,000; 10,000; 15,000; 20,000; 25,000; 30,000; 35,000; and 40,000 g/mol, up to a high of any one of 45,000; 50,000; 55,000; 60,000, 65,000; 70,000; 75,000; 80,000, 85,000; 90,000; 100,000; 110,000; 120,000; 130,000; 150,000; 200,000; 250,000; 300,000; 400,000; 500,000 g/mol, provided that the high end of the range is greater than the low end of the range. Thus, for instance, the VTP composition can have Mw within the range of about 5,000 to about 500,000 g/mol, about 20,000 to about 400,000 g/mol, or about 40,000 to about 300,000 g/mol, etc.

In an aspect, the VTP composition can have moderate to low Mw, such as Mw less than or equal to about any one of 50,000, 45,000, and 40,000 g/mol, such as from about 5,000 to about 50,000 g/mol, or from about 5,000 to about 45,000 g/mol. In an aspect, VTP compositions can advantageously impart broad MWD (e.g., Mw/Mn of about 3 or more) in the blended polymer composition comprising the VTPs.

VTPs can be highly branched, including long chain branching. Thus, in particular aspects, the VTP can have a branching index ($g'_{vis}$) of 0.95 or less, preferably 0.9 or less, preferably 0.85 or less, as determined by GPC, as described in the Test Methods section below.

As provided by the present methods, the monomeric make-up of the VTP compositions comprising VTPs can vary. In an aspect, VTP compositions can include units derived from one or more monomers, each monomer independently selected from $C_2$-$C_{20}$ α-olefins. In an aspect, the monomers are each selected from $C_2$-$C_{12}$ α-olefins. Suitable monomers can include any monomer(s) suitable for polymerization using a VTP catalyst or HMP catalyst. For example, in an aspect, VTPs present in the VTP composition can be homopolyethylene or homopolypropylene. Also, VTPs can be a copolymer, such as an EP(D)M. In particular aspects, VTP compositions can comprise units derived from ethylene, one or more $C_3$-$C_{12}$ α-olefins, and one or more dienes. The one or more $C_3$-$C_{12}$ α-olefins can, for instance, include one or more of propylene and 1-butene. The VTP compositions can comprise from about 20 to about 80 wt % ethylene-derived units, from about 0 to about 20 wt % diene-derived units, and the balance one or more $C_3$-$C_8$ α-olefins More specifically, the one or more $C_3$-$C_8$ olefins can include one or more of propylene and 1-butene High Molecular Weight Polymer Compositions High molecular weight polymer compositions ("HMP compositions") are labeled as a matter of convenience for differentiating from the above-described VTPs, and/or for differentiating polymers produced by HMP catalyst systems from those produced by VTP catalyst systems, for purposes of this disclosure. The use of the "HMP" label, alone, is not intended to restrict the molecular weight (e.g., Mw) of these or other polymers. Rather, suitable ranges of Mw for these polymers are described herein, and guidance should be taken from that description.

In general, HMP composition can have the same monomer and/or comonomer content suitable as described for VTP composition above. HMP composition can be copolymers. For instance, HMP compositions can be ethylene-based copolymers having the ethylene, optional diene, and additional $C_3$-$C_{12}$ α-olefin derived content as noted previously for various VTPs. HMP compositions can be EP(D)M copolymers.

Generally, HMPs will exhibit some differences from VTPs. For instance, although HMPs can have vinyl terminations, no particular amount is required for the HMPs utilized herein.

Furthermore, HMP compositions can have high Mw. For instance, HMP compositions can have Mw of 100,000. In various embodiments, HMP compositions can have Mw of at least any one of 50,000, 75,000, 100,000; 105,000; 110,000; 115,000; 120,000; 125,000; 130,000; 135,000; 140,000; 145,000; 150,000; 155,000; 160,000, 165,000; 170,000; 175,000; and 180,000 g/mol. Although an upper limit of Mw is not necessary for HMP composition, HMP compositions can have Mw ranging from any one of the aforementioned low values to a high value of any one of about 190,000; 200,000; 210,000; 220,000; 230,000; 240,000; 250,000; 260,000; 270,000; 280,000; 290,000; 300,000; 310,000; 320,000; 330,000; 340,000; 350,000; 400,000; 450,000; 500,000; 550,000; and 600,000 g/mol.

EXAMPLES

The catalysts used in the Examples of the present invention were Catalyst 1 and Catalyst 2 and the activators used in the Examples were Activator 1 and Activator 2, all shown below. Catalyst 1 and Activators 1 and 2 were obtained from Albemarle Corp. Catalyst 2 was prepared according to the process described in U.S. Pat. No. 9,458,254, incorporated herein by reference.

Catalyst 1

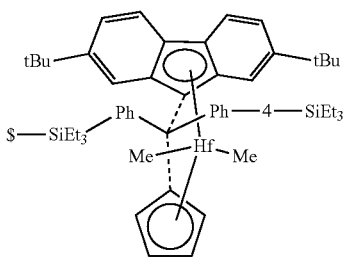

Catalyst 2

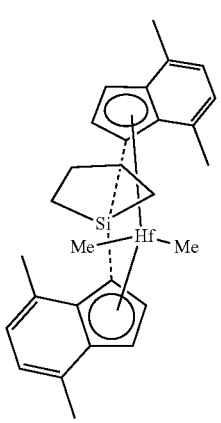

Activator 1

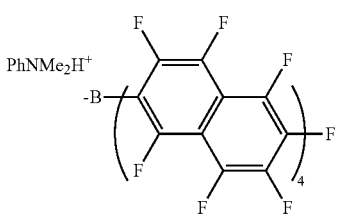

Activator 2

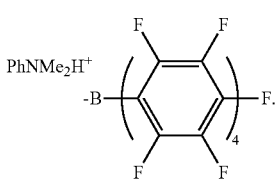

Polymer Synthesis: Examples 1-7

Polymerizations were carried out using a solution process in a 1 L continuous stirred tank reactor (CSTR). Feeds of solvent (isohexane, iC6), monomers, and scavenger (Tri-n-octylaluminum as Tri-n-octylaluminum (TNOAL) as a solution of $1.843 \times 10^{-6}$ mol/mL with iC6) were provided to the reactor. A solution of metallocene and activator (1.02 equiv) in toluene was metered into the reactor and the heat maintained with steam/water mixtures. Samples were taken directly from the reactor, quenched with water, treated with antioxidant (Irganox 1076), then dried. Process conditions are specified in tables 1a and 1b.

Polymer Synthesis: Examples 8-10

Polymerizations were carried out using a solution process in a 28 L CSTR. Feeds of solvent (isohexane, iC6), monomers, hydrogen, and scavenger (TNOAL 3 wt % in iC6) were provided to the reactor. Solutions of metallocene 1 and activator (1.0 equiv) in toluene were metered into the reactor and the heat of polymerization used to drive the solution temperature to the target values. Samples were taken directly from the reactor, quenched with water, treated with antioxidant, and then dried. Process conditions are specified in Tables 1c and 1d.

Polymer Blend Synthesis: Blend Samples 1-3 and Comparative Sample 1

Using the polymers and amounts specified in table 5, melt blends were prepared on a PHI press set at 285° F., and 10 tons of pressure for 10-15 s duration each pressing. Samples were pressed into a circular film between Mylar sheets then combined and pressed again. The samples were then folded twice and pressed again. This was repeated a total of 4 presses. Then the sample was analyzed by SAOS.

Polymer Blend Synthesis: Blend Samples 4-6 and Comparative Sample 2

Combined polymer (in amounts given in table 8) cut into small pieces, toluene (300 mL) and Irganox 1076 (ca. 20 mg) in a flask and stirred for ca 24 h. Poured into Teflon lined tray. Rinsed flask with toluene (100 mL) into tray. Heated tray with steam to evaporate solvent After about an hour, most of solvent was removed. Added MeOH (100 mL) and continued to heat for another hour to evaporate MeOH and residual toluene. Removed polymer as film from tray then dried in a vacuum oven (110-120° C.) for about 24 h. Pressed starting materials and blends into films prior to running SAOS. SAOS data is summarized below.

TABLE 1a

Reactor conditions for preparing polymer in Examples 1-7

| Example | Catalyst | Activator | Reactor Temp (° C.) | Reactor P (PSIG) | Ethylene Feed (g/min) | Propylene Feed (g/min) | ENB Feed (g/min) |
|---|---|---|---|---|---|---|---|
| 1 | Cat 2 | Act 1 | 100 | 320 | 6.78 | 6 | 2.5 |
| 2 | Cat 2 | Act 1 | 100 | 320 | 6.78 | 6 | 2.5 |
| 3 | Cat 1 | Act 2 | 120 | 320 | 1.9 | 1.5 | 0 |
| 4 | Cat 1 | Act 2 | 100 | 320 | 3 | 6 | 1.1125 |
| 5 | Cat 2 | Act 1 | 100 | 320 | 6.78 | 6 | 2.5 |
| 6 | Cat 2 | Act 1 | 100 | 320 | 5.5 | 7.5 | 0.801 |
| 7 | Cat 2 | Act 1 | 100 | 320 | 5.5 | 8 | 0.8455 |

TABLE 1b

Reactor conditions for preparing polymer in Examples 1-7

| Example | Catalyst Feed (mol/min) | Mol Cat/ g Tol | Isohexane Feed (g/min) | Steady State Reactor wt % C2 | Steady State Reactor wt % C3 | Steady State Reactor wt % ENB | Cat Efficiency (g Pol/ mol cat) |
|---|---|---|---|---|---|---|---|
| 1 | 1.85E−07 | 1.78E−07 | 78.9 | 3.53% | 4.58% | 2.22% | 2.8E+07 |
| 2 | 1.39E−07 | 1.78E−07 | 78.9 | 4.56% | 5.05% | 2.32% | 2.6E+07 |
| 3 | 1.13E−07 | 1.09E−07 | 81.5 | 0.95% | 1.20% |  | 1.4E+07 |
| 4 | 8.91E−08 | 1.63E−07 | 82.3 | 2.28% | 5.58% | 1.09% | 2.0E+07 |
| 5 | 2.16E−07 | 1.78E−07 | 81.5 | 2.01% | 3.42% | 2.01% | 3.7E+07 |
| 6 | 1.23E−07 | 1.78E−07 | 82.1 | 2.53% | 5.61% | 0.52% | 5.1E+07 |
| 7 | 1.23E−07 | 1.78E−07 | 82.1 | 4.57% | 7.58% | 0.77% | 1.5E+07 |

TABLE 1c

Reactor conditions for preparing polymer in Examples 8-10

| Example | Reactor P (PSIG) | Reactor Temp (° C.) | Feed Temp (° C.) | Isohexane Feed (Kg/h) | Ethylene Feed (Kg/h) | Propylene Feed (Kg/h) |
|---|---|---|---|---|---|---|
| 8 | 1567 | 105 | 14.9 | 35.0 | 3.1 | 3.31 |
| 9 | 1631 | 94.1 | 10.3 | 44.5 | 4.3 | 3.79 |
| 10 | 1630 | 87.7 | 10.2 | 43.6 | 4.3 | 3.79 |

TABLE 1d

Reactor conditions for preparing polymer in Examples 8-10

| Example | ENB Feed (Kg/h) | H2 Feed (sccm) | TNOA Feed (Kg/h) | MCN, Act | Catalyst Conc. (mol/L) | Catalyst Solution Feed (mL/min) |
|---|---|---|---|---|---|---|
| 8 | 0.5 | 90 | 1.50E−02 | 1, 2 | 5.25E−04 | 1.4 |
| 9 | 0.7 | 1.85 | 1.50E−02 | 1, 2 | 5.25E−04 | 5.2 |
| 10 | 0.7 | 1.45 | 1.50E−02 | 1, 2 | 5.25E−04 | 5.3 |

TABLE 2

Mooney and Composition Data for Examples 1-10 (C2 and ENB from IR)

| Example | ML (MU) | MLRA (MU s) | cMLRA (Mu s) | MST | MSTRA | Polymer C2 (wt %) corrected | Polymer ENB (wt %) |
|---|---|---|---|---|---|---|---|
| 1 | 52.4 | 482 | 887 |  |  | 63.9 | 6.9 |
| 2 | 70.2 | 519 | 626 |  |  | 63.7 | 6.8 |
| 3 | 74.6 | 165 | 182 |  |  | 69.6 | 0.0 |
| 4 |  |  |  | 61.0 | 497 | 49.1 | 5.4 |
| 5 | 36.4 | 274 | 852 |  |  | 60.2 | 6.6 |
| 6 | 19.0 | 66 | 526 |  |  | 56.2 | 5.5 |
| 7 | 35.0 | 152 | 499 |  |  | 58.5 | 5.5 |
| 8 | 21.8 | 18 | 114 |  |  | 53.7 | 4.8 |
| 9 |  |  |  | 22.1 | 83 | 59.9 | 5.3 |
| 10 |  |  |  | 22.7 | 83 | 59.3 | 5.0 |

TABLE 3a

Summary of SAOS Data (125° C.) for Examples 1-4

| ID | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|
| Ex 1 | 30.9 | 0.614 | 449,178 | 3,105 | 145 | None |
| Ex 2 | 36.0 | 0.728 | 454,964 | 4,110 | 111 | None |

TABLE 3a-continued

Summary of SAOS Data (125° C.) for Examples 1-4

| ID | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|
| Ex 3 | 56.3 | 1.966 | 212,675 | 5,573 | 38 | 4.768 |
| Ex 4 | 53.0 | 0.986 | 1,275,676 | 6,720 | 190 | 0.235 |

TABLE 3b

Summary of SAOS Data (100° C.) for Examples 5-10

| ID | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|
| Ex 5 | 31.8 | 0.636 | 462,869 | 3,220 | 144 | None |
| Ex 6 | 40.4 | 0.974 | 183,336 | 2,821 | 65 | 0.147 |
| Ex 7 | 47.3 | 1.31 | 206,650 | 4,002 | 52 | 2.936 |
| Ex 8 | 56.2 | 2.865 | 84,216 | 3,935 | 21 | 8.631 |
| Ex 9 | 53.5 | 1.106 | 993,400 | 6,695 | 148 | 0.368 |
| Ex 10 | 53.2 | 1.109 | 1,003,886 | 6,744 | 149 | 0.362 |

TABLE 4a

Comparison of SAOS Data (125° C.) for Examples 2 (Cat 2) and 3 (Cat 1)

| ID | ML | MLRA | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|---|---|
| Ex 2 | 70.2 | 519 | 36.0 | 0.728 | 454,964 | 4,110 | 111 | None |
| Ex 3 | 74.6 | 165 | 56.3 | 1.966 | 212,675 | 5,573 | 38 | 4.768 |

TABLE 4b

Comparison of SAOS Data (100° C.) for Examples 6 (Cat 2) and 8 (Cat 1)

| ID | ML | MLRA | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s ) | Crossover Point (Rad/s) |
|---|---|---|---|---|---|---|---|---|
| Ex 6 | 19.0 | 66 | 40.4 | 0.974 | 183,336 | 2,821 | 65 | 0.147 |
| Ex 8 | 21.8 | 18 | 56.2 | 2.865 | 84,216 | 3,935 | 21 | 8.631 |

TABLE 5

Blend Design: Blend Samples 1-3 and Comparative Blend Sample 1

| | Blend 1 | Blend 2 | Blend 3 | Comp 1 | ML | MLRA | MST | MSTRA |
|---|---|---|---|---|---|---|---|---|
| Ex 1 | | | | 5 g | 52.4 | 482 | | |
| Ex 2 | 5 g | 5 g | | | 70.2 | 519 | | |
| Ex 3 | | | 5 g | | 74.6 | 165 | | |
| Ex 4 | 2 g | 5 g | 2 g | 2 g | | | 61.0 | 497 |

TABLE 6

Summary of SAOS Data (125° C.) for Blends 1-3 and Comparative Blend 1

| ID | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|
| Blend 1 | 38.7 | 0.825 | 561,285 | 4,729 | 119 | None |
| Blend 2 | 41.2 | 0.887 | 666,197 | 4,983 | 134 | None |
| Blend 3 | 34.3 | 0.728 | 580,912 | 3,875 | 150 | None |
| Comp 1 | 54.2 | 1.566 | 409,460 | 6,132 | 67 | 1.848 |

TABLE 7

Comparison of SAOS Data (125° C.) for Blend 1 and Comparative Blend 1

| ID | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|
| Blend 1 | 38.7 | 0.825 | 561,285 | 4,729 | 119 | None |
| Comp 1 | 54.2 | 1.566 | 409,460 | 6,132 | 67 | 1.848 |

TABLE 8

Blend Design: Blend Samples 4-6 and Comparative Blend 2

| | Blend 4 | Blend 5 | Blend 6 | Comp 2 | ML | MLRA | cMLRA | MST | MSTRA |
|---|---|---|---|---|---|---|---|---|---|
| Ex 5 | 5.5 | | | | 36.4 | 274 | 852 | | |
| Ex 6 | | 5.5 | | | 19 | 66 | 526 | | |
| Ex 7 | | | 5.5 | | 35 | 152 | 499 | | |
| Ex 8 | | | | 5.5 | 21.8 | 18 | 114 | | |
| Ex 9 | 4.5 | 4.5 | 2.25 | | | | | 22.1 | 83 |
| Ex 10 | | | 2.25 | 4.5 | | | | 22.7 | 83 |

TABLE 9

Molecular Weight Data for Examples 5-10 and Blends 4-6 and Comparative Blend 2

| ID | MCN | Mn (IR) | Mw (LS) | Mz (LS) | Mw/Mn | Mz/Mn | g' (Vis Avg) |
|---|---|---|---|---|---|---|---|
| Ex 1 | 2 | 56,837 | 217,301 | 590,162 | 3.8 | 10.4 | 0.852 |
| Ex 2 | 2 | 71,572 | 225,544 | 596,796 | 3.2 | 8.3 | 0.849 |
| Ex 3 | 1 | 98,661 | 203,545 | 299,407 | 2.1 | 3.0 | 1.033 |
| Ex 4 | 1 | 199,640 | 438,543 | 727,299 | 2.2 | 3.6 | 1.021 |
| Blend 1 | 2, 1 | 91,820 | 301,797 | 656,582 | 3.3 | 7.2 | 0.9 |
| Blend 2 | 2, 1 | 106,055 | 307,507 | 670,176 | 2.9 | 6.3 | 1 |
| Blend 3 | 2, 1 | 69,328 | 290,280 | 693,243 | 4.2 | 10.0 | 0.892 |
| Comp 1 | 1, 1 | 123,585 | 326,267 | 560,510 | 2.6 | 4.5 | 0.932 |
| Ex 5 | 2 | 50,232 | 152,707 | 296,380 | 3.0 | 5.9 | 0.876 |
| Ex 6 | 2 | 48,155 | 127,664 | 261,790 | 2.7 | 5.4 | 0.914 |
| Ex 7 | 2 | 63,011 | 208,452 | 883,957 | 3.3 | 14.0 | 0.882 |
| Ex 8 | 1 | 62,027 | 147,571 | 233,480 | 2.4 | 3.8 | 0.973 |
| Ex 9 | 1 | 141,739 | 327,840 | 518,504 | 2.3 | 3.7 | 1.037 |
| Ex 10 | 1 | 139,853 | 324,449 | 515,863 | 2.3 | 3.7 | 1.028 |
| Blend 4 | 2, 1 | 70,738 | 236,706 | 467,891 | 3.3 | 6.6 | 0.97 |
| Blend 5 | 2, 1 | 67,841 | 218,948 | 453,914 | 3.2 | 6.7 | 0.986 |
| Blend 6 | 2, 1 | 84,173 | 253,391 | 616,440 | 3.0 | 7.3 | 0.966 |
| Comp 2 | 1, 1 | 82,372 | 227,687 | 465,060 | 2.8 | 5.6 | 1.029 |

TABLE 10

SAOS Data (100° C.) for Blend Samples 4-6 and Comparative Blend Sample 2

| ID | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|
| Blend 4 | 39.8 | 0.815 | 756,934 | 4,595 | 165 | None |
| Blend 5 | 42.0 | 0.98 | 521,802 | 4,496 | 116 | 0.214 |

TABLE 10-continued

SAOS Data (100° C.) for Blend Samples 4-6 and Comparative Blend Sample 2

| ID | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|
| Blend 6 | 45.4 | 1.063 | 524,378 | 5,098 | 103 | 0.410 |
| Comp 2 | 48.3 | 1.264 | 399,051 | 5,074 | 79 | 0.909 |

TABLE 11

Comparison of SAOS (100° C.) Data for Blend 5 and Comparative Blend 2

| ID | δ at G* = 100,000 Pa | Tan (δ) at 0.245 Rad/s | η* (Pa s) @ 0.1 Rad/s | η* (Pa s) @ 128 Rad/s | STR = η* (0.1 Rad/s)/ η* (128 Rad/s) | Crossover Point (Rad/s) |
|---|---|---|---|---|---|---|
| Blend 5 | 42.0 | 0.98 | 521,802 | 4,496 | 116 | 0.214 |
| Comp 2 | 48.3 | 1.264 | 399,051 | 5,074 | 79 | 0.909 |

TABLE 12

Olefins per 1000 C. for Examples 1-10 Determined by $^1$H NMR Spectroscopy

| Example | 1 | 2 | 3 | 4 | 5 | 6 | 7 | 8 | 9 | 10 |
|---|---|---|---|---|---|---|---|---|---|---|
| MCN | 2 | 2 | 1 | 1 | 2 | 2 | 2 | 1 | 1 | 1 |
| Vinylenes (δ5.55-5.31) | 0.00 | 0.02 | 0.00 | 0.00 | 0.02 | 0.01 | 0.01 | 0.00 | 0.00 | 0.00 |
| ENB major (δ5.3) | 5.69 | 5.75 | 0.13 | 4.89 | 5.81 | 4.53 | 4.58 | 4.44 | 4.26 | 4.71 |
| Trisubstituted olefins (δ5.3-5.12) | 0.04 | 0.04 | 0.00 | 0.33 | 0.04 | 0.03 | 0.06 | 0.00 | 0.10 | 0.15 |
| ENB minor (δ5.1) | 1.35 | 1.37 | 0.00 | 1.09 | 1.41 | 1.11 | 1.12 | 0.97 | 1.03 | 1.14 |
| Vinyls (δ5.04-4.95) | 0.15 | 0.11 | 0.02 | 0.02 | 0.17 | 0.19 | 0.15 | 0.00 | 0.02 | 0.00 |
| Vinylidenes (δ4.84-4.69) | 0.04 | 0.09 | 0.31 | 0.23 | 0.06 | 0.04 | 0.08 | 0.07 | 0.12 | 0.21 |
| Mol % Vinyls | 65.2 | 42.3 | 6.1 | 3.4 | 58.6 | 70.4 | 50.0 | 0.0 | 8.3 | 0.0 |

Figure 2:
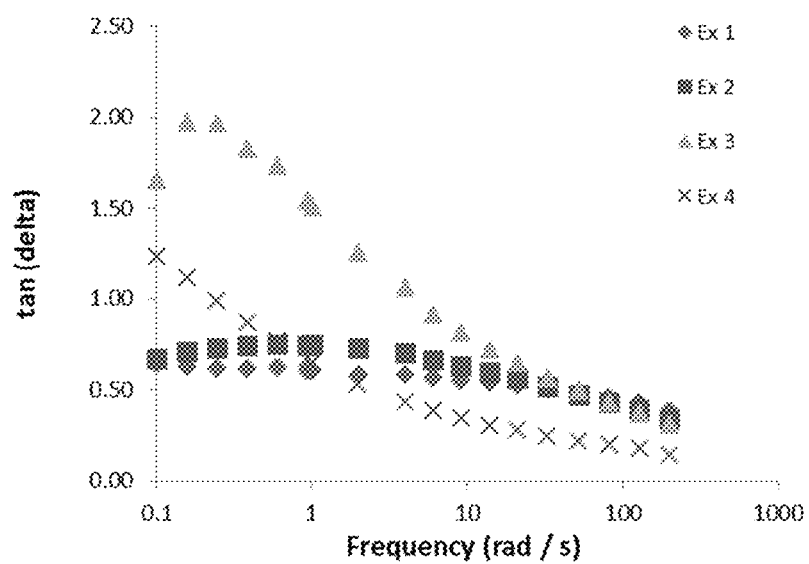
FIG. 2 shows Tan(δ) vs Frequency for Examples 1-4.
Figure 3:
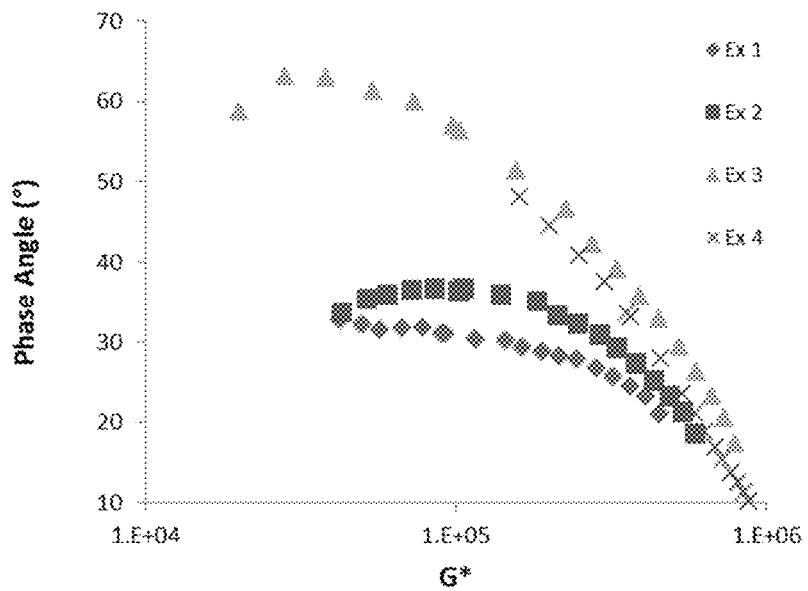
FIG. 3 is a Van Gurp Palmen plot of Phase angle (δ) vs Complex viscosity (G*) for Examples 1-4.
Figure 4:
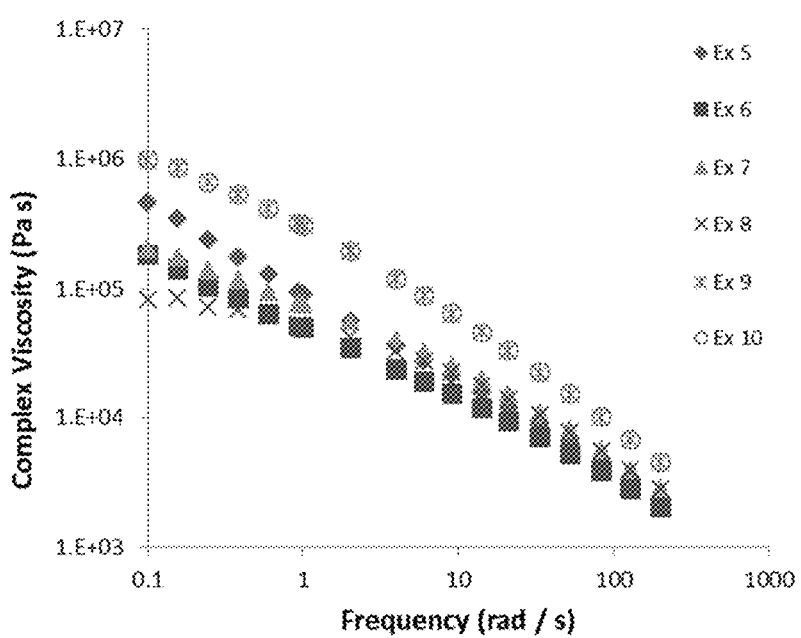
FIG. 4 shows Complex viscosity vs Frequency for Examples 5-10.
Figure 5:
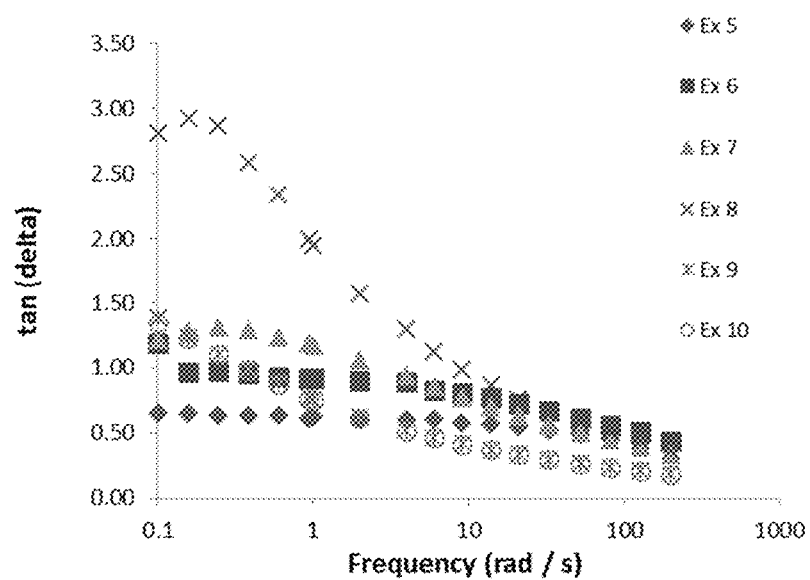
FIG. 5 shows Tan(δ) vs Frequency for Examples 5-10
Figure 6:
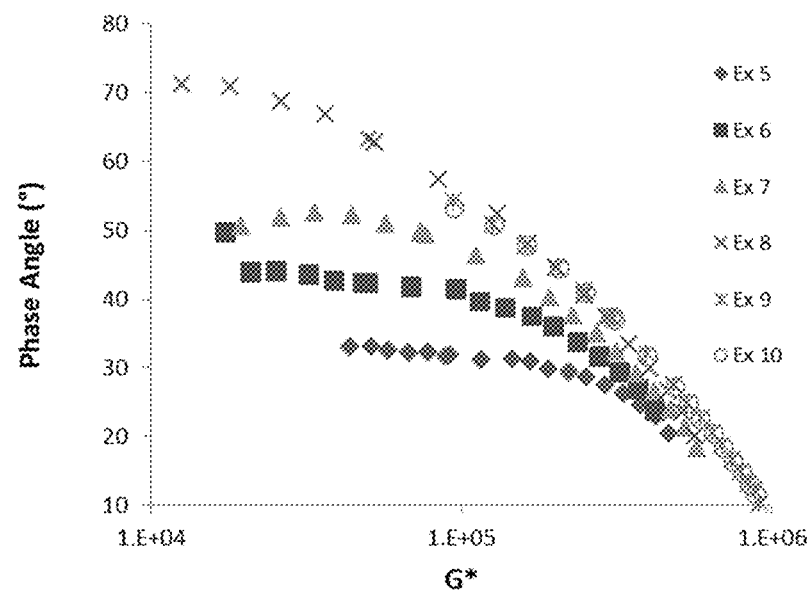
FIG. 6 is a Van Gurp Palmen plot of Phase angle (δ) vs Complex viscosity (G*) for Examples 5-10.
Figure 7:
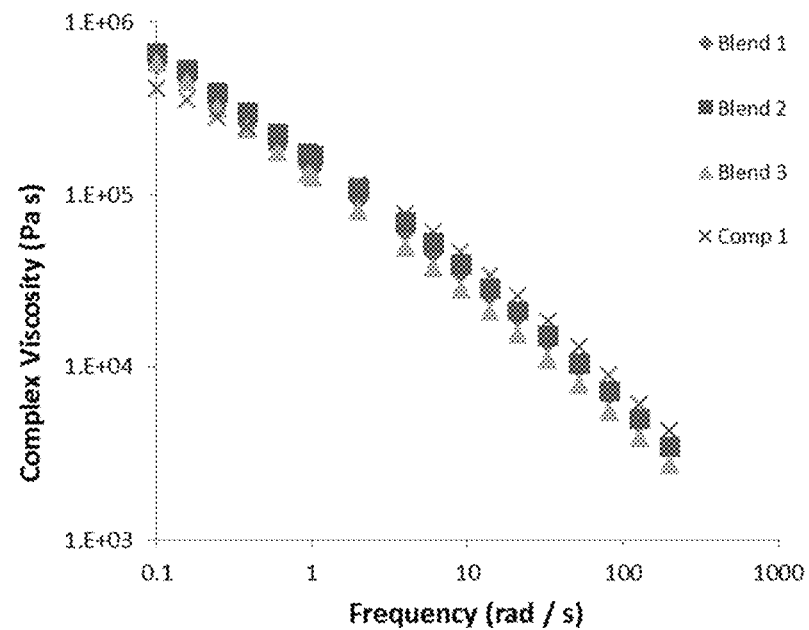
FIG. 7 shows Complex viscosity vs Frequency for Blends 1-3 and Comp 1.
Figure 8:
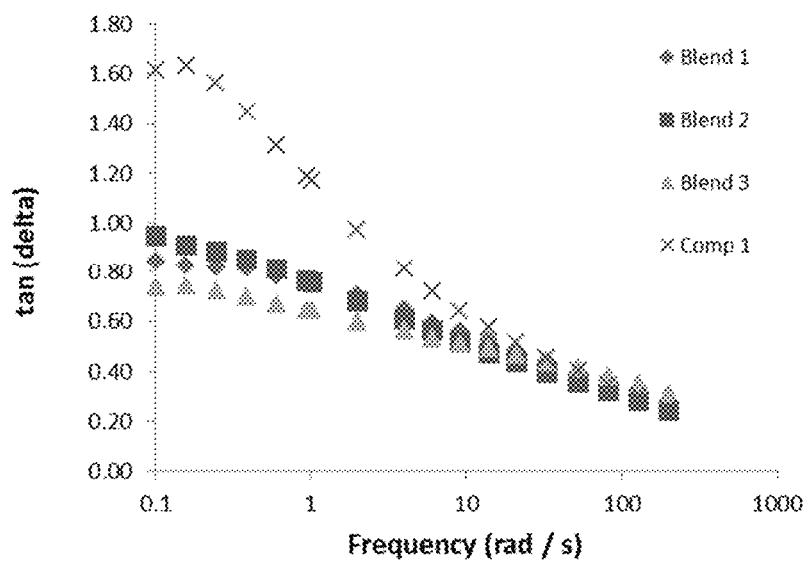
FIG. 8 shows Tan(δ) vs Frequency for Blends 1-3 and Comp 1.
Figure 9:
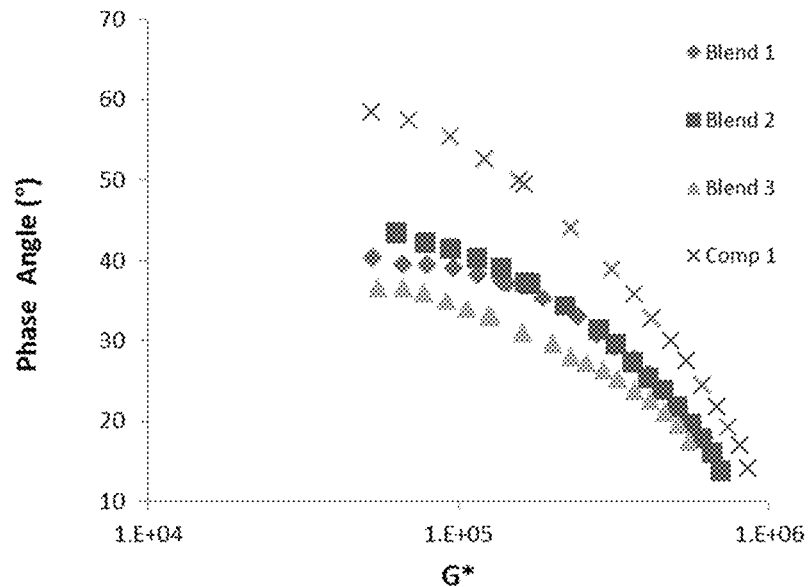
FIG. 9 is a Van Gurp Palmen plot of Phase angle (δ) vs Complex viscosity (G*) for Blends 1-3 and Comp 1.
Figure 10:
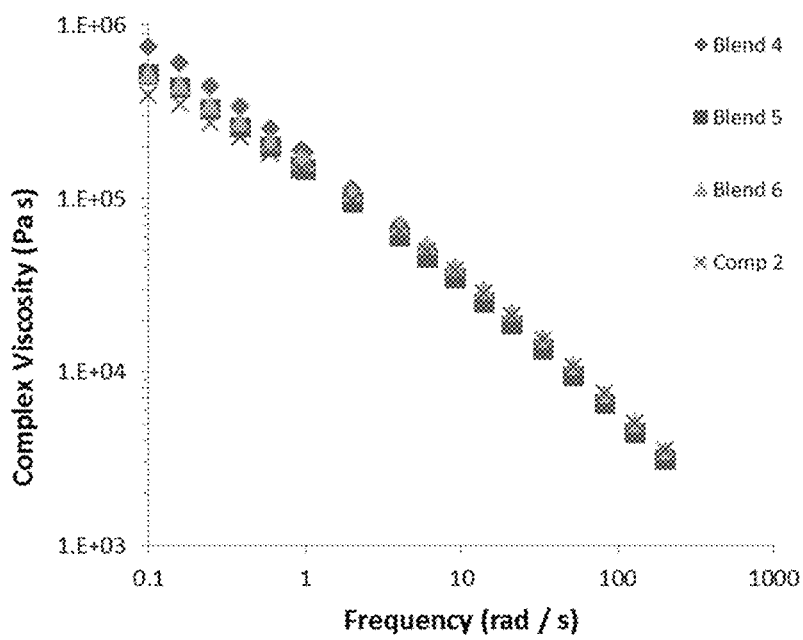
FIG. 10 shows Complex viscosity vs Frequency for Blends 4-6 and Comp 2.
Figure 11:
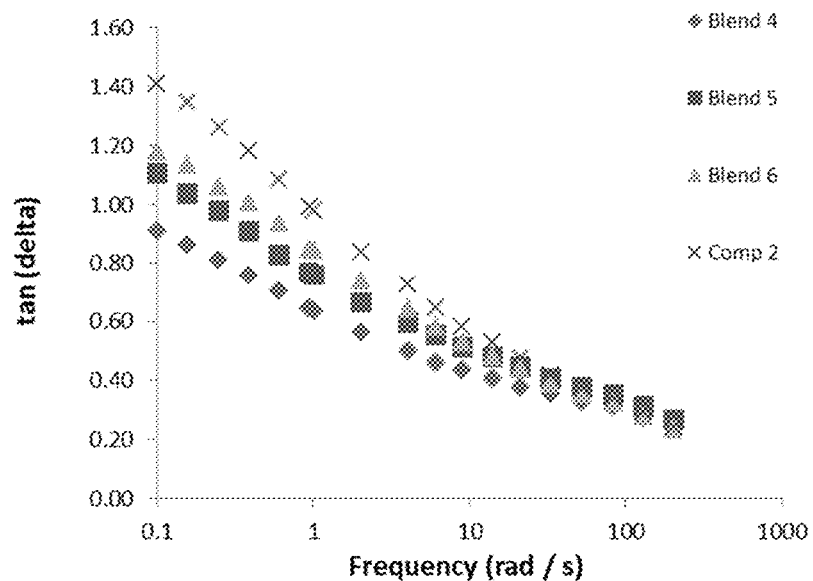
FIG. 11 show's Tan(δ) vs Frequency for Blends 4-6 and Comp 2.
Figure 12:
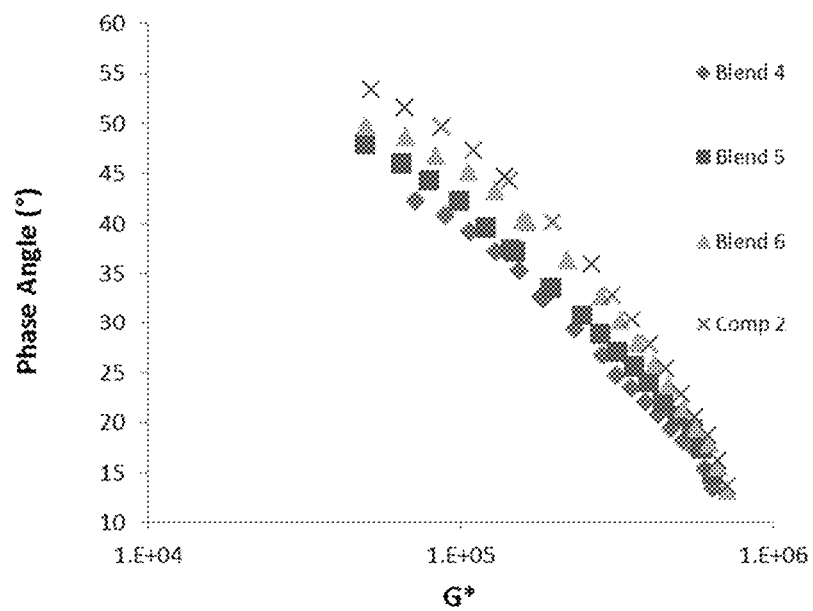
FIG. 12 is a Van Gurp Palmen plot of Phase angle (δ) vs Complex viscosity (G*) for Blends 4-6 and Comp 2.

FIGS. 1, 4, 7, and 10 show the Complex viscosity versus Frequency for inventive and comparative blends. FIGS. 2, 5, 8, and 11 show the tan (d) versus Frequency for inventive and comparative blends. FIGS. 3, 6, 9, and 12 show the Van Gurp Palmen Plot of Phase angle (d) versus Complex viscosity for inventive and comparative blends.

As shown in the Examples and Figures of the invention, the inventors have discovered an inventive EPDM with advantageous rheological properties. This system, Cat 2, has the advantage over Cat 1 in having higher catalyst activity under conditions to make EPDM as illustrated in examples 6 (Cat 2, 5.1 E7 Kg Pol/mol Cat) and 4 (Cat 1, 2.0 E7 Kg Pol/mol Cat) of Table 1a and 1b.

This system, Cat 2, has the advantage of giving higher vinyl olefin end groups in EPDM polymers than those derived from Cat 1. This is shown in data from Table 12. All of the EPDM from Cat 2 has vinyl groups >0.1/1000C where those from Cat 1 has vinyl groups ≤0.02/1000C. This high vinyl content is believed to allow EPDM with vinyl endgroups to incorporate into growing EPDM chains on the catalysts leading to long chain branching (LCB).

Molecular weight analysis indicates that polymers made with Cat 2 under steady state conditions have broader MWD than Cat 1 and also lower viscosity averaged g' than those made with Cat 1 (Table 9). This is consistent with the presence of LCB in these materials. These two factors give the advantage of improved processability to EPDM derived from Cat 2.

Improved processability is seen in the higher cMLRA of Ex 1, 2 vs Ex 3 and also Ex 5-7 vs Ex 8. The cMLRA normalizes the MLRA to a constant ML of 80. The longer time necessary for the material to relax is consistent with greater entanglements due to LCB in the polymer.

Improved processability is also seen in the shear rheology for EPDM derived from Cat 2 alone (Tables 3,4 and Plots 1, 2) and in blends with other EPDM of different molecular weight (Tables 6, 7, 10, 11 and Plots 3, 4). Cat 2 EPDM has a higher sheer thinning ratio (STR), lower tan(δ) at 0.245 s$^{-1}$, and lower δ at G*=100 KPa than that made with Cat 1 as illustrated in example 2 (Cat 2) vs example 3 (Cat 1), Table 4a, and example 6 (Cat 2) vs example 8 (Cat 1), Table 4b. The higher sheer thinning ratio indicates that a polymer will have reduced viscosity and thus higher through put in an extruder, either by itself or as a compound with carbon black, oil and other additives, at high shear rates and increased viscosity which is important for bubble stability in foams at low sheer rates. The lower tan(d) and lower δ at G*=100 KPa indicate that the material behaves more like an elastic solid than the comparative materials. This is also consistent with the crossover point (at which storage and loss moduli are equal) for inventive samples shifted to lower frequency. These important attributes contributes to increased part stability, post extrusion, of materials either by themselves or compounded with carbon black, oil and other additives.

Blends of polymer made with Cat 2 and Cat 1 also have significantly improved processability as indicated by a higher sheer thinning ratio (STR), lower tan(δ) at 0.245 s$^{-1}$, and lower δ at G*=100 KPa titan the comparative blends made only with material from Cat 1. This is shown in Tables 5-7 and best with the close comparison of Blend 1 and Comparative Blend 1 in Table 7. It is also shown in a separate set of blends in Tables 8-11 and particularly with the close comparison of Blend 5 and Comparative Blend 2 in Table 11.

The invention claimed is:

1. A method of making a blended polymer composition having enhanced elasticity, wherein the blended polymer composition comprises a sheer thinning ratio (STR) greater than 100, the method comprising the steps of:
  (a) providing a first polymer composition, wherein the first polymer composition is a vinyl terminated polymer (VTP) composition produced with a VTP catalyst compound;
  (b) providing a second polymer composition, wherein the second polymer composition is a high molecular-weight polymer (HMP) composition produced with a HMP catalyst compound;
  (c) combining the first polymer composition and the second polymer composition; and
  (d) recovering a blended polymer composition;
  wherein weight average molecular weight of the HMP composition is greater than that of the VTP composition; and
  wherein the VTP catalyst compound is represented by the formula:

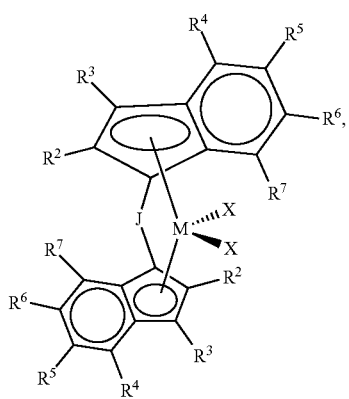

wherein (1) J is a divalent bridging group comprising C, Si or both;
  (2) M is a group 4 transition metal;
  (3) each X is independently a univalent anionic ligand, or two Xs joined to form a chelating ligand, a diene ligand, or an alkylidene ligand; and
  (4) each of $R^2$-$R^7$ is independently hydrogen, $C_1$-$C_{50}$ substituted or unsubstituted hydrocarbyl, or $C_1$-$C_{50}$ substituted or unsubstituted halocarbyl, provided that any one or more of the pairs $R^4$ and $R^5$, $R^5$ and $R^6$, and $R^6$ and $R^7$ can optionally be bonded together to form a saturated or partially saturated cyclic or fused ring structure.

2. The method of claim 1, wherein the VTP composition is a copolymer of (a) ethylene; (b) one or more alpha-olefins or cyclic olefins; and (c) diene.

3. The method of claim 2, wherein the diene is 5-ethylidene-2-norbornene.

4. The method of claim 2, wherein the one or more alpha-olefins or cyclic olefins is selected from propylene, 1-butene, 1-hexene, 1-octene, or combinations thereof.

5. The method of claim 4, wherein the one or more alpha-olefins or cyclic olefins is propylene.

6. The method of claim 1, wherein a total ethylene content of the VTP composition is about 20-100 wt %, a total alpha-olefin or cyclic olefin content of the VTP composition is about 20-80 wt %, and the a total diene content of the VTP composition is about less than or equal to about 20 wt %, based on the VTP composition.

7. The method of claim 1, wherein the VTP composition is a copolymer of (ethylene)x(propylene)y(diene)z where x=20-80 wt %, y=80-20 wt %, z=0-20 wt % and x+y+z=100 wt %.

8. The method of claim 1, wherein the HMP composition comprises ethylene, one or more olefins, cyclic olefins, and dienes.

9. The method of claim 1, wherein the first polymer composition and the second polymer composition are blended in solution to form the blended polymer composition.

10. The method of claim 1, wherein the first polymer composition and/or the second polymer composition are produced at a temperature between about 75° C. and about 250° C.

11. The method of claim 1, wherein the blended polymer composition has an elasticity, as measured by the tangent of the phase angle, of between about 0.650 rad/s and about 0.975 rad/s.

12. The method of claim 1, wherein each $R^3$ of the VTP catalyst compound is hydrogen; each $R^4$ is independently a C1-C10 alkyl; each $R^2$ and $R^7$ is independently hydrogen, or C1-C10 alkyl, each $R^5$ and $R^6$ is independently hydrogen, C1-C50 substituted or unsubstituted hydrocarbyl, or C1-C50 substituted or unsubstituted halocarbyl; $R^4$ and $R^5$, $R^5$ and $R^6$, and/or $R^6$ and $R^7$ may optionally be bonded together to form a ring structure; and J is represented by a formula $Ra_2J'$, where J' is C or Si, and each Ra is, independently, C1 to C20 substituted or unsubstituted hydrocarbyl, provided that the two Ra may be bonded together to form a saturated or partially saturated cyclic or fused ring structure that incorporates J'.

13. The method of claim 1, wherein the two Ra in a formula $Ra_2J'$ are bonded together to form a saturated or partially saturated cyclic or fused ring structure that incorporates J'.

14. The method of claim 1, wherein, within the VTP catalyst compound, J is selected from the group consisting of: cyclopentamethylenesilylene, cyclotetramethylenesilylene, and cyclotrimethylenesilylene.

15. The method of claim 1, wherein, within the VTP catalyst compound, $R^2$ is independently selected from the group consisting of hydrogen, methyl, ethyl, propyl, butyl, pentyl, heptyl, hexyl, octyl, nonyl, decyl and isomers thereof; and further wherein $R^4$ is independently selected from the group consisting of methyl, ethyl, propyl, butyl, pentyl, heptyl, hexyl, octyl, nonyl, decyl and isomers thereof.

16. The method of claim 1, wherein the VTP catalyst compound comprises cyclotetramethylenesilylene-bis(4,7-trimethylinden-1-yl)hafnium dimethyl.

17. The method of claim 1, wherein the VTP composition has one or more of the following properties:

(a) weight average molecular weight in the range of about 5,000 g/mol to about 500,000 g/mol;

(b) weight average molecular weight (Mw)/number average molecular (Mn) of greater than about 2.5;

(c) g' (vis average) of less than about 0.95;

(d) Storage modulus is equivalent to the loss modulus at less than about 4 rad/s at 100° C.;

(e) Storage modulus is not equivalent to the loss modulus between about 0.1 rad/s and 128 rad/s at 100° C.;

(f) cMLRA greater than about 300 if ML (1+4, 125° C.) is greater than or equal to about 10; and (g) tan (δ) at 0.245 rad/s of less than about 1 at 100° C.

18. The method of claim 1, wherein the blended polymer composition has one or more of the following properties:

(a) δ at G* of 100,000 Pa is less than about 48°;

(b) Storage modulus is equivalent to the loss modulus at less than about 0.9 rad/s at 100° C.;

(c) tan (δ) at 0.245 rad/s of less than about 1.2 at 100° C.; and (d) tan (δ) at 0.245 rad/s of less than about 1.6 at 125° C.

19. The method of claim 1, wherein the HMP catalyst compound is represented by the formula:

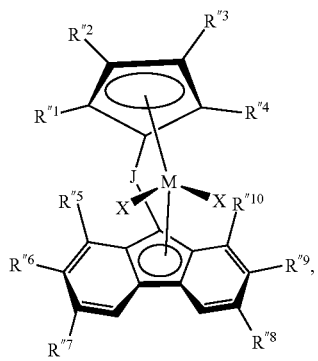

wherein (1) J is a divalent bridging group comprising C, Si, or both;

(2) M is a group 4 metal;

(3) each X is independently a univalent anionic ligand, or two Xs joined and bound to the metal atom to form a metallocycle ring, or two Xs joined to form a chelating ligand, a diene ligand, or an alkylidene ligand; and (4) each $R'''^1$, $R'''^2$, $R'''^3$, $R'''^4$, $R'''^5$, $R'''^6$, $R'''^7$, $R'''^8$, $R'''^9$, and $R'''^{10}$ is independently hydrogen, $C_1$-$C_{50}$ hydrocarbyl, substituted hydrocarbyl, halocarbyl, or substituted halocarbyl provided that any one or more of the pairs $R'''^1$ and $R'''^2$, $R'''^3$ and $R'''^4$, $R'''^5$ and $R'''^6$, $R'''^6$ and $R'''^7$, $R'''^8$ and $R'''^9$, and $R'''^9$ and $R'''^{10}$, can optionally be bonded together to form a saturated or partially saturated cyclic or fused ring structure. In certain aspects, the bridging group, J, is represented by $R^*_2C$, $R^*_2Si$, $R^*_2CCR^*_2$, $R^*C=CR^*$, $R^*_2CSiR^*_2$, or $R^*_2SiSiR^*_2$, where each $R^*$ is, independently, hydrogen or a $C_1$ to $C_{20}$ containing hydrocarbyl or substituted hydrocarbyl and optionally two or more adjacent $R^*$ join to form a substituted or unsubstituted, saturated, partially unsaturated or aromatic, cyclic or polycyclic substituent.

* * * * *